United States Patent
Johnson et al.

(10) Patent No.: US 9,882,215 B2
(45) Date of Patent: Jan. 30, 2018

(54) ELECTROCHEMICAL ENERGY STORAGE DEVICES COMPRISING SELF-COMPENSATING POLYMERS

(71) Applicant: Arizona Board of Regents on behalf of Arizona State University, Scottsdale, AZ (US)

(72) Inventors: Paul Johnson, Phoenix, AZ (US); Jose Antonio Bautista-Martinez, Mesa, AZ (US); Cody Friesen, Fort McDowell, AZ (US); Elise Switzer, Napa, CA (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 147 days.

(21) Appl. No.: 14/710,509

(22) Filed: May 12, 2015

(65) Prior Publication Data
US 2015/0333331 A1 Nov. 19, 2015

Related U.S. Application Data

(60) Provisional application No. 61/992,781, filed on May 13, 2014, provisional application No. 62/000,843, filed on May 20, 2014.

(51) Int. Cl.
*H01M 4/00* (2006.01)
*H01M 4/60* (2006.01)
*C08G 75/06* (2006.01)

(52) U.S. Cl.
CPC ............ *H01M 4/608* (2013.01); *C08G 75/06* (2013.01); *H01M 4/606* (2013.01)

(58) Field of Classification Search
CPC ........ H01M 4/606; H01M 4/608; C08G 75/06
See application file for complete search history.

(56) References Cited

U.S. PATENT DOCUMENTS 4,265,789 A 5/1981 Christopherson et al.
4,375,427 A 3/1983 Miller et al.
(Continued)

FOREIGN PATENT DOCUMENTS

JP 2005-510886 4/2005
WO WO 97/30445 8/1997
(Continued)

OTHER PUBLICATIONS

J.C. Chin, International Search Report for PCT/US2014/020874, dated Jul. 1, 2014.
(Continued)

*Primary Examiner* — Mark F Huff
*Assistant Examiner* — Monique Wills
(74) *Attorney, Agent, or Firm* — Knobbe, Martens, Olson & Bear LLP

(57) ABSTRACT

The disclosed technology relates generally to devices comprising conductive polymers and more particularly to electrochemical devices comprising self-compensating conductive polymers. In one aspect, electrochemical energy storage device comprises a negative electrode comprising an active material including a redox-active polymer. The device additionally comprises a positive electrode comprising an active material including a redox-active polymer. The device further comprises an electrolyte material interposed between the negative electrode and positive electrode and configured to conduct mobile counterions therethrough between the negative electrode and positive electrode. At least one of the negative electrode redox-active polymer and the positive electrode redox-active polymer comprises a zwitterionic polymer unit configured to reversibly switch between a zwitterionic state in which the zwitterionic polymer unit has first and second charge centers having opposite charge states that compensate each other, and a non-zwitterionic state in
(Continued)

which the zwitterionic polymer unit has one of the first and second charge centers whose charge state is compensated by mobile counterions.

20 Claims, 8 Drawing Sheets

(56) References Cited

U.S. PATENT DOCUMENTS

| | | | |
|---|---|---|---|
| 4,535,039 | A | 8/1985 | Naarmann et al. |
| 4,869,979 | A | 9/1989 | Ohtani et al. |
| 5,512,391 | A | 4/1996 | Fleischer |
| 5,569,708 | A | 10/1996 | Wudl et al. |
| 5,731,105 | A | 3/1998 | Fleischer et al. |
| 5,840,443 | A | 11/1998 | Gregg et al. |
| 5,891,968 | A * | 4/1999 | Wudl .................. C08G 73/00 525/410 |
| 5,973,598 | A | 10/1999 | Beigel |
| 6,045,952 | A | 4/2000 | Kerr et al. |
| 6,300,015 | B1 | 10/2001 | Nishiyama et al. |
| 6,700,491 | B2 | 3/2004 | Shafer |
| 6,762,683 | B1 | 7/2004 | Giesler |
| 6,776,929 | B2 | 8/2004 | Hossan et al. |
| 6,899,974 | B2 | 5/2005 | Kamisuki et al. |
| 6,944,424 | B2 | 9/2005 | Heinrich et al. |
| 7,482,620 | B2 | 1/2009 | Kugler et al. |
| 7,675,123 | B2 | 3/2010 | Leenders et al. |
| 8,260,203 | B2 | 9/2012 | Brantner |
| 2003/0230746 | A1 | 12/2003 | Stasiak |
| 2004/0214078 | A1 | 10/2004 | Mitani et al. |
| 2004/0256644 | A1 | 12/2004 | Kugler et al. |
| 2007/0059901 | A1 | 3/2007 | Majumdar et al. |
| 2007/0238014 | A1 | 10/2007 | Koshina et al. |
| 2008/0303637 | A1 | 12/2008 | Gelbman et al. |
| 2009/0090907 | A1 | 4/2009 | Kugler et al. |
| 2009/0117574 | A1 | 5/2009 | Labgold et al. |
| 2009/0176162 | A1 | 7/2009 | Exnar et al. |
| 2011/0221385 | A1 | 9/2011 | Partovi et al. |
| 2011/0300808 | A1 | 12/2011 | Rokhsaz et al. |
| 2012/0077084 | A1 | 3/2012 | Christensen et al. |
| 2013/0230771 | A1 | 9/2013 | Deronzier et al. |
| 2014/0038036 | A1 | 2/2014 | Nishide et al. |

FOREIGN PATENT DOCUMENTS

| | | |
|---|---|---|
| WO | 2014164150 A1 | 10/2014 |
| WO | 2015106132 A1 | 7/2015 |

OTHER PUBLICATIONS

S.C. Kang, International Search Report and Written Opinion for PCT/US2015/010863, dated Apr. 22, 2014.

D.S. Kim, Written Opinion of the International Searching Authority for PCT/US2015/030409, dated Aug. 17, 2015.

D.S. Kim, Written Opinion of the International Searching Authority for PCT/US2015/030412, dated Aug. 17, 2015, Oct. 6, 2015.

Chae, I. S. et al. Redox equilibrium of a zwitterionic radical polymer in a non-aqueous electrolyte as a novel Li+ host material in a Li-ion battery. Journal of Materials Chemistry A, vol. 1, pp. 9608-9611. (2013).

Golriz, A. A. et al. Redox active polymer brushes with phenothiazine moieties. ACS Applied Materials & Interfaces. vol. 5, pp. 2485-2494 (2013).

Laschewsky, A. Structures and Syntheis of Zwitterionic Polymers, 6, pp. 1544-1601 (2014).

Li, Z. H. et al., Effect of zwitterionic salt on the electrochemical properties of a solid polymer electrolyte with high temperature stability for lithium ion batteries, Electrochimica Acta 56, pp. 804-809 (2010).

Chae, I. S. Synthesis of Zwitterionic Redox-Active Radical Polymers and Their Application to an Organic Secondary Battery, PhD thesis, Waseda University, Feb. 2013.

Cardos, J. et al., Synthesis and Characterization of Zwitterionic Polymers with a Flexible Lateral Chain, J. Phys. Chem. C, 114, pp. 14261-14268 (2010).

U.S. Appl. No. 11/763,658, filed Jun. 15, 2007, Hossan et al.

Ferrer-Vidal et al. Integration of sensors and RFID's on ultra-low-cost paper-based substrates for wireless sensor networks applications, In: 2006 $2^{nd}$ *IEEE Workshop on Wireless Mesh Networks*, 2006, pp. 126-128.

Potyrailo et al. "Battery-free radio frequency identification (RFID) sensors for food quality and safety", *Journal of Agricultural and Food Chemistry*, 2012, vol. 60, No. 35, pp. 8535-8543.

Song, et al. "Redox-Active Polypyrrole: Toward Polymer-Based Batteries", *Advanced Materials*, 2006, vol. 18, No. 13, pp. 1764-1768.

Song, et al. "Towards sustainable and versatile energy storage devices: an overview of organic electrode materials," *Energy & Environmental Science*, RSC Publishing, vol. 6, pp. 2280-2301, 2013.

* cited by examiner

ELECTROCHEMICAL ENERGY STORAGE DEVICES COMPRISING SELF-COMPENSATING POLYMERS

CROSS-REFERENCE TO RELATED APPLICATIONS

This application claims priority to U.S. Provisional Patent Application No. 61/992,781, filed May 13, 2014, and U.S. Provisional Patent Application No. 62/000,843, filed May 20, 2014, each of which is assigned to the assignee of currently claimed subject matter and incorporated by reference in its entirety.

STATEMENT REGARDING FEDERALLY SPONSORED R&D

This invention was made with government support under DE-AR0000459 awarded by the Department of Energy. The government has certain rights in the invention.

FIELD

The disclosed technology relates generally to devices comprising conductive polymers and more particularly to electrochemical devices comprising self-compensating conductive polymers.

BACKGROUND

Conductive polymers are used in a wide range of applications because of certain advantages, such as light weight, flexibility and low cost, among other advantages. Conductive polymers are increasingly being proposed as alternative electrode materials for electrochemical devices, such as batteries. Of particular interest is a category of electrically conductive polymers known as redox-active polymers. Redox-active polymers are polymers comprising functional groups capable of reversibly transitioning between at least two oxidation states, wherein the transition between the oxidation states can occur through oxidation (i.e. electron loss) and reduction (i.e. electron gain) processes. However, only some pairs of redox-active polymers are technologically and economically feasible for forming the positive and negative electrodes of the electrochemical cells. For example, only some pairs have a voltage gap between a cathode with higher redox potential and an anode with lower redox potential that is large enough to be technologically and economically feasible. Thus, there is a need to increase the range of "pairable" redox-active polymers that can be used in the electrochemical cells. In the technology disclosed herein, embodiments can enable a wider range of possible cell voltages while still delivering high energy density of the cell.

SUMMARY

In a first aspect, an electrochemical energy storage device comprises an anode, or a negative electrode, comprising an active material including a redox-active polymer and configured to be oxidized during a discharging operation. The device additionally comprises a cathode, or a positive electrode, comprising an active material including a redox-active polymer and configured to be reduced during the discharging operation. The device further comprises an electrolyte material interposed between the negative electrode and positive electrode, the electrolyte material comprising an ionically conductive polymer and configured to conduct mobile counterions therethrough between the negative electrode and positive electrode. At least one of the negative electrode redox-active polymer and the positive electrode redox-active polymer comprises a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by one or more of the mobile counterions.

In a second aspect, an electrochemical energy storage device comprises an anode comprising an active material including an redox-active polymer and configured to be oxidized during a discharging operation, wherein the negative electrode redox-active polymer is an n-type polymer. The device further comprises a positive electrode active material comprising a redox-active polymer and configured to be reduced during the discharging operation. The positive electrode redox-active polymer is a p-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state. The device further comprises an electrolyte material interposed between the negative electrode and positive electrode, the electrolyte material comprising an ionically conductive polymer and configured to conduct the mobile cationic species therethrough from the negative electrode active material to the positive electrode active material during the discharging operation. In some embodiments, the negative electrode active material is further configured to be reduced during a charging operation, the positive electrode active material is further configured to be oxidized during the charging operation, and the electrolyte material is further configured to conduct the mobile cationic species from the positive electrode active material towards the negative electrode active material during the charging operation.

In a third aspect, an electrochemical energy storage device comprises an anode, or negative electrode, comprising an active material including an redox-active polymer and configured to be oxidized during a discharging operation, wherein the negative electrode redox-active polymer is an n-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile anionic species in the cationic state. The device additionally comprises a positive electrode active material comprising a redox-active polymer and configured to be reduced during the discharging operation, wherein the positive electrode redox-active polymer is a p-type polymer. The device further comprises an electrolyte material interposed between the negative electrode and positive electrode, the electrolyte material comprising an ionically conductive polymer and configured to conduct the mobile anionic species therethrough from the negative electrode to the positive electrode during the discharging operation. In some embodiments, the negative electrode active material is further configured to be reduced during a charging operation, the positive electrode active material is further configured to be oxidized during the charging operation, and the electrolyte material is further configured to conduct the mobile anionic species from the positive electrode to the negative electrode during the charging operation.

In a fourth aspect, an electrochemical energy storage device comprises an anode, or a negative electrode, comprising an active material including an redox-active polymer and configured to be oxidized during a discharging operation, wherein the negative electrode redox-active polymer is a p-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state. The device additionally comprises a cathode, or a positive electrode, comprising an active material including a redox-active polymer and configured to be reduced during the discharging operation, wherein the positive electrode redox-active polymer is a p-type polymer comprising a zwitterionic polymer unit configured to reversibly switch between a zwitterionic state in which the zwitterionic polymer unit has third and fourth charge centers having opposite charge states that compensate each other, and a non-zwitterionic state in which the zwitterionic polymer unit has one of the third and fourth charge centers whose charge state is compensated by the mobile cationic species in the anionic state. The device further comprises an electrolyte material interposed between the negative electrode and positive electrode, the electrolyte material comprising an ionically conductive polymer configured to conduct the mobile cationic species therethrough from the negative electrode to the positive electrode during the discharging operation. In some embodiments, the negative electrode active material is further configured to be reduced during a charging operation, the positive electrode active material is further configured to be oxidized during the charging operation, and the electrolyte material is further configured to conduct the mobile cationic species from the negative electrode to the positive electrode during the charging operation.

BRIEF DESCRIPTION OF THE DRAWINGS

Embodiments of the invention are described by way of example only, with reference to the accompanying drawings in which corresponding reference symbols indicate corresponding parts, and in which.

DETAILED DESCRIPTION

Figure 1A:
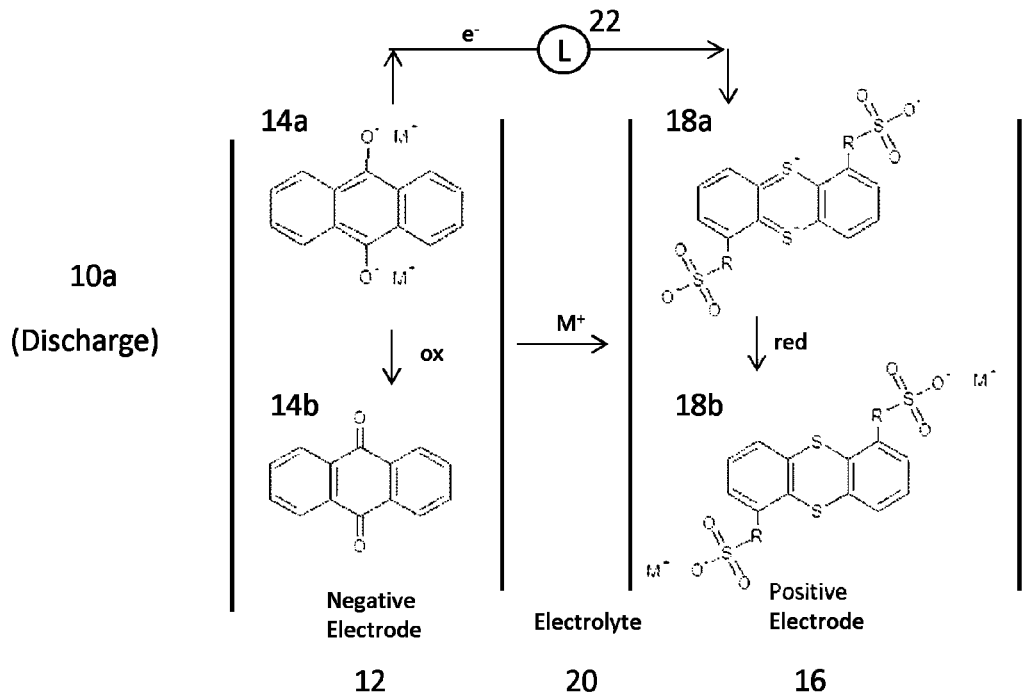
FIGS. 1(a) and 1(b) depict an electrochemical cell comprising a negative electrode comprising an n-type polymer and a positive electrode comprising a self-compensated p-type polymer which includes a zwitterionic polymer unit, undergoing electrochemical redox processes during (a) a discharge operation and (b) a charge operation, respectively, according to some embodiments.

Some electrically conductive polymers comprise conjugated double bonds, which can give rise to electronic conduction. One example of such polymers includes polyacetylene. A category of electrically conductive polymers known as redox-active polymers are chemistries comprising functional groups capable of reversibly transitioning between at least two oxidation states, wherein the transition between the oxidation states can occur through oxidation (i.e. electron loss) and reduction (i.e. electron gain) processes. As used herein, a redox reaction or a redox process refers to reversible oxidation and reduction reactions or processes. In addition to redox activity provided by the redox center, redox-active polymers may be electrically conductive through the polymer chain (e.g. polyaniline). For the purposes of the following description, the term "redox-active polymer" may be used interchangeably with the term "redox polymer" to describe conductive redox-active polymers.

Redox active polymers may be categorized based on the type of redox reactions the polymers are configured to undergo. One category includes n-type redox-active polymers, which can be configured to undergo a reversible redox reaction between a neutral state and a negatively charged state. Another category includes p-type redox-active polymers, which can be configured to undergo a reversible redox reaction between a neutral state and a positively charged state. Yet another category includes bipolar redox-active polymers, where a neutral state can be either reduced to a negatively charged state or oxidized to a positively charged state. In practice, bipolar redox active polymers are often effectively configured as n-type or p-type, depending on the particular operating potential of the electrode. In the electrochemical reduction reaction of n-type redox-active polymers, a cationic species may neutralize the negative charge;

conversely, in the electrochemical oxidation reaction of p-type redox-active polymers, anions may neutralize positive charge.

Such redox active polymers can be used to form electrodes in battery cells. A common battery cell configuration employing redox-active polymers employ one electrode as a redox-active polymer paired to another electrode being a metal anode (usually lithium) to produce a battery cell sometimes known as a "rocking-chair" battery. As used herein and in the industry, a "rocking chair" battery cell, sometimes also referred to as a "swing" type battery cell, refers to a battery cell in which a single ionic charge transfer species (e.g. Li$^+$) can be transferred back and forth between a negative electrode and a positive electrode through an electrolyte during charge-discharge cycles. In one aspect, a "rocking chair" battery cell configuration can be advantageous in that the electrolyte serves as a conductor of the single ion species (e.g., cation such as Li+ or an anion), and a minimal amount of electrolyte serves to maximize the energy density of the entire cell. However, in other configurations in which two or more ionic charge transfer species are transferred between the electrodes, for example in configurations where an n-type negative electrode polymer is paired to a p-type positive electrode, a greater amount of electrolyte may be used to provide sufficient amounts of both anionic species and cationic species to compensate i.e. neutralize the charge at both electrodes, while still delivering sufficient ionic conductivity. Not only does this lower the energy density of the entire cell, but the electrolyte can experience a significant concentration gradient on charge-discharge cycling. The pairing of an n-type redox-active polymer (e.g. anode) with a p-type redox active polymer (e.g. cathode) can present a significant challenge because to cycle the battery, the electrolyte contains both 1) cations to compensate for the charge associated with redox process of the n-type polymer switching between a neutral and anionic state, and 2) anions to compensate for the charge associated with the redox process of the p-type polymer switching between a neutral and cationic state. This issue is noted by those skilled in the art (see for example Song et. al, Energy & Environmental Science, 2013, 6, 2280-2301).

This issue may be further clarified by way of the following example approximations of a typical volume of electrolyte that may be used to pair an n-type negative electrode polymer to a p-type positive electrode. By way of an illustrative example only, the molecular mass of an example anode redox active system including an n-type polyanthraquinone (PAQ) can be, for example, 208 g/mol. Such an example anode redox active system can be coupled to an example cathode system including a p-type phenothiazine, which can have a molecular mass of 198.3 g/mol. Assuming that the density of the polymerized film is 1.2 g/ml, the molar volume can be estimated to be on the range of about 150-200 cm$^3$/mol (e.g. phenothiazine is 165.25 cm$^3$/mol; PAQ is 173.33 cm$^3$/mol). Assuming two electrons per redox center, the molarity of the polymer electrode is on the order of 10 M (e.g. phenothiazine at 12.1 M; PAQ at 11.54 M). For charge balance resulting in 1 mol of ions for every mole of charge, 12 mols of salt can be used for 1 L of each electrode. Common electrolyte concentrations are between 0.3 M and 1 M electrolyte which translates to about 40 L of electrolyte to balance the charge (i.e. 12 mol at 0.3 M); 12 mol at 1 M is 12 L. This suggests storing the mobile cation Li$^+$ in the anode can result in as much as 15% volume increase and storing the mobile anion ClO$_4^-$ in the cathode can result in as much as 37% volume increase, ultimately consuming the electrolyte from the solvent. Based on the inventors' analysis, pairing certain n-type anode and a certain p-type cathode may not be desirable for reasons related to the relatively large volume changes, high electrolyte volume requirements and large charge gradients, among other reasons. Thus, there is a need for redox-active polymer electrodes that does not suffer from such undesirable characteristics associated with the volume changes.

Advantageously, by employing one of various embodiments of electrochemical cells described herein, relatively small volume changes, relatively low electrolyte volume requirements and relatively small charge gradients. In embodiments, the ratio of (molarity of charge balancing mobile ions in the electrolyte)/(molarity of negative electrode active charge centers+molarity of positive electrode active charge centers) may be <1, e.g., 0.1 to 0.4, 0.4 to 0.7 or 0.7 to 0.9, in a self-compensated cell.

The disclosed technology relates to methods of pairing redox-active polymer electrodes in a "rocking-chair" type cell, regardless of the type (i.e., n or p type) of the electrodes, and devices having such paired electrodes. That is, the disclosed technology advantageously enables battery cells in which both electrodes comprise redox-active polymers, while the electrolyte contains a single mobile ionic species (i.e., anionic or cationic species) that compensate for the charge associated with either or both of the electrodes. Thus, the need for one ionic species (e.g., a mobile cationic species) to compensate for the charge associated with the redox process of one of the electrodes (e.g., n-type polymer of an anode switching between a neutral and anionic state) and another ionic species (e.g., a mobile anionic species) to compensate for the charge associated with the redox process of another one of the electrodes (e.g., p-type polymer of a cathode switching between a neutral and cationic state). It will be appreciated that this opens up the flexibility and range of "pairable" redox-active polymers, in effect delivering a wider range of possible cell voltages while still delivering high energy density of the cell. In addition to providing a "rocking-chair" battery regardless of the type of redox-active polymers that are paired, the volume of electrolyte is significantly reduced, potentially approaching 40% and alleviating any stability issues of the cell relating to large charge gradients associated with shuttling both mobile cations and mobile anions between the electrodes and electrolyte.

In one aspect, the present disclosure solves a limitation in pairing p-type and n-type polymers in an electrochemical cell by incorporating redox-active polymers capable of forming zwitterions. As described herein, a zwitterion refers to a molecule that has at least one positive, i.e. cationic charge center and at least one negative, i.e. anionic, charge center that exist simultaneously in the same molecule, such that the molecule as a whole can be in a net charge-neutral state, referred to herein as a zwitterionic state. It will be appreciated that in zwitterions, a charged atom is bonded to an adjacent atom by one or more covalent bonds, which is distinguishable from a charged atom of a non-zwitterion such as, e.g., an ionic molecule (e.g., NaCl and NH$_4$Cl) that is not covalently bonded. Furthermore, in zwitterions, atoms having opposite charges are not immediately adjacent to one another. When a charge imbalance is created between the at least one positive charge center and the at least one negative charge center, the zwitterion can be in a net charged state, referred to herein as a non-zwitterionic state. In a non-zwitterionic state, the net charge of the zwitterion can be balanced by an extrinsic charged atom or molecule, e.g., a mobile cation or a mobile anion.

As commonly understood in the industry, a polymer comprises a sequence or a chain of repeating groups of atoms linked to each other by primary, e.g., covalent bonds. As used herein, a polymer unit refers to a segment of the polymer chain, e.g., one or more groups of atoms that can be repeated to form longer chains. In various embodiments, a polymer comprises two or more such groups of atoms and can comprise as few as two such groups (i.e., a dimer), and a polymer unit can comprise as few as one group (i.e., a monomer). As used herein, "self-compensating" refers to a charge compensating mechanism in a polymer unit whereby, during a charge-discharge cycle of a battery cell comprising the polymer unit in an electrode, a change in the charge state of the polymer unit, which may result from switching between redox states (i.e. by gaining or losing one or more electrons), is internally compensated within the polymer unit itself. In contrast, in non-self-compensating polymers, a change in the charge state of a polymer unit may be compensated not within the polymer unit itself but through one or more mobiles ion from outside of the polymer unit itself, e.g., from the electrode of opposite polarity and/or the electrolyte material. In various embodiments, some self-compensating polymer units are configured to form a zwitterion, which may be referred to herein as zwitterionic polymer units.

A distinction between a self-compensating n-type polymer unit and a non-self-compensating n-type polymer unit is illustrated via FIGS. 1(a)-1(b) and 2(a)-2(b). Referring to the negative electrode 12 illustrated in FIGS. 1(a) and 1(b), during a charge-discharge cycle of a battery cell 10a/10b having a non-self-compensating n-type polymer unit 14a/14b, the n-type polymer unit 14a/14b undergoes a redox reaction between a neutral state 14b and a negatively charged anionic state 14a. The n-type polymer unit 14a/14b in the anionic (i.e., negatively charged) state 14a may be compensated by a mobile cation (e.g., $R_4^+$) in the negative electrode 12 of FIGS. 1(a) and 1(b)). In comparison, referring to the negative electrode 32 illustrated in FIG. 2, during a charge-discharge cycle of a battery cell 30a/30b having a self-compensating n-type polymer unit 34a/34b, comprising e.g., a zwitterionic polymer unit according to some embodiments, the n-type polymer unit 34a/34b switches between a cationic state 34b and a "net neutral" state 34a, where the "net neutral" state comprises a zwitterionic state. In the zwitterionic state, a negative charge of the redox center (e.g. oxygen in anthraquinone) is compensated by the positive charge center (e.g. $R_4N^+$) within the polymer unit itself, thus being internally "self-compensated." That is, in the zwitterionic state, the n-type polymer unit 34a/34b forms a charge-neutral unit without a mobile cation as in FIGS. 1(a) and 1(b). In the cationic state 34b (i.e. non-zwitterionic state), the positive charge center (e.g. $R_4N^+$) of the polymer is compensated by a mobile anion (e.g., $A^-$ in the negative electrode of FIGS. 2(a)-2(b)).

A distinction between a self-compensating p-type polymer unit and a non-self-compensating p-type polymer unit is illustrated via FIGS. 1(a)-1(b) and 2(a)-2(b). Referring to the positive electrode 36 illustrated in FIG. 2(a)-(b), during a charge-discharge cycle of a battery cell 30a/30b having a non-self-compensating p-type polymer unit 38a/38b, the p-type polymer unit 38a/38b undergoes a redox reaction between a neutral state 38b and a positively charged cationic state 38a. The p-type polymer unit in the cationic (i.e., positively charged) state 38a may be compensated by a mobile anion (e.g., $A^-$ in the positive electrode of FIGS. 2(a)-2(b)). In comparison, referring to the positive electrode 16 illustrated in FIGS. 1(a)-1(b), during a charge-discharge cycle of a battery cell having a self-compensating p-type polymer unit 18a/18b comprising a zwitterionic polymer unit according to some embodiments, the p-type polymer unit 18a/18b switches between an anionic state 18b and a "net neutral" state 18a at the "molecular level," where the "net neutral" state 18a comprises a zwitterionic state. In the zwitterionic state, a positive charge of the redox center (e.g. $S^+$ in thianthrene) is self-compensated by the negative charge center (e.g. $SO_3^-$) within the polymer unit 18a/18b itself, thus being "self-compensated." That is, in the zwitterionic state, the p-type polymer unit 18a/18b forms a charge-neutral unit without a mobile anion as in FIGS. 2(a) and 2(b). In the anionic state (i.e. non-zwitterionic state), the negative charge center (e.g. $SO_3^-$) of the polymer is compensated by a mobile cation (e.g., $M^+$ in the positive electrode of FIGS. 1(a)-1(b)).

In one aspect, various embodiments disclosed herein provides for an electrochemical energy storage device comprising a negative electrode redox-active polymer film capable of being oxidized during a discharging operation. The electrochemical energy storage device further comprises a positive electrode redox-active polymer film capable of being reduced during a discharging operation. For the purposes of the following description, the term "negative electrode" may be used interchangeably with the term "anode" or "anodic layer" and, "positive electrode" may be used interchangeably with the term "cathode" or "cathodic layer" to distinguish between the electrodes of the electrochemical energy storage device. As described herein, an anode refers to an electrode at which an oxidation reaction occurs thereby producing electrons during a discharge operation, and at which a reduction reaction occurs consuming electrons during a charge operation. Conversely, a cathode refers to an electrode at which a reduction reaction occurs consuming electrons during a discharge operation, and at which an oxidation reaction occurs thereby producing electrons during a charge operation. The negative electrode redox-active polymer is characterized by a first redox potential and the positive electrode redox-active polymer is characterized by a second redox potential which is greater than the first redox potential. The negative electrode active material and the positive electrode active material are both electronically conductive and ionically conductive.

In various embodiments described in the following with respect to FIGS. 1-3, electrodes of an electrochemical storage device have redox-active polymer, at least one of which comprises a polymer unit, referred to herein as a zwitterionic polymer unit, that is configured to form a zwitterionic state in which charge is self-compensated. As described above, above, the zwitterionic polymer unit can be "self-compensated," which refers to a state of a polymer unit whereby, the charge state of the polymer unit, which may result from switching between redox states (i.e. by gaining or losing one or more electrons), is internally compensated within the polymer unit itself. As described above, a zwitterionic polymer unit is configured to form a zwitterionic state, wherein the polymer unit can internally maintain electroneutrality stably by having both cationic and anionic charge centers that exist within the polymer unit simultaneously. The zwitterionic polymer unit can alternatively be in a stable non-zwitterionic state (i.e. cationic or anionic state), in which a charge of the polymer unit is compensated by a mobile counterion species. Unlike the zwitterionic state, in the non-zwitterionic state, the mobile counterion migrates to and from the opposite electrode through an electrolyte material, e.g., an electrolyte layer, situated between the negative electrode and positive electrode, for example in a separator.

In various embodiments disclosed herein with respect to FIGS. 1-3, an electrochemical energy storage device comprises an anode comprising a negative electrode active material including a negative electrode redox-active polymer and configured to be oxidized during a discharging operation. The device additionally comprises a cathode comprising an active material including a redox-active polymer and configured to be reduced during the discharging operation. The device further comprises an electrolyte material interposed between the negative electrode active material and the positive electrode active material, the electrolyte material comprising an ionically conductive polymer and configured to conduct mobile counterions therethrough between the negative electrode and positive electrode active materials. At least one of the negative electrode redox-active polymer and the positive electrode redox-active polymer comprises a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by one or more of the mobile counterions.

In some embodiments where one of the negative electrode redox-active polymer or the positive electrode redox-active polymer comprises a zwitterionic polymer unit, the other of the negative electrode redox-active polymer or the positive electrode redox-active polymer does not include a zwitterionic polymer unit.

In various embodiments disclosed herein with respect to FIGS. 1-3, the electrolyte material comprises an ionically conductive polymer film for conducting mobile counterions between the negative electrode and the positive electrode. The counterion species migrate in and out of the bulk of the polymer and between the negative electrode and positive electrode during a discharge operation. In some embodiments, a charging operation may be performed such that the negative electrode redox-active polymer film is reduced and the positive electrode redox-active polymer film is oxidized. Exemplary embodiments of various cell configurations will now be described to illustrate the various configurations and electrochemical processes.

Figure 1B:
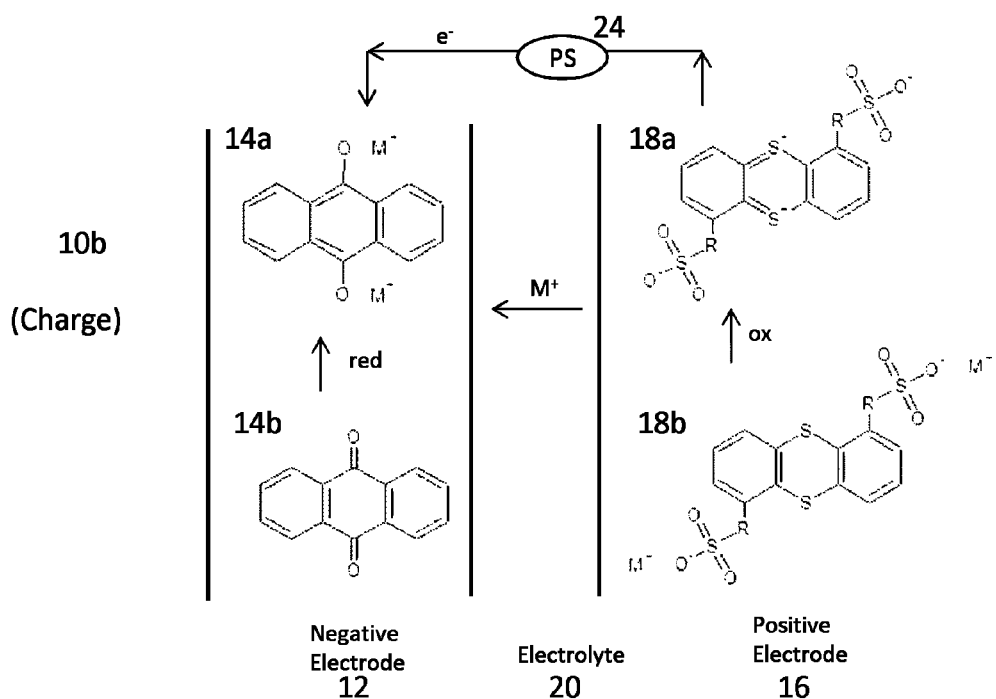

In a first embodiment, an electrochemical energy storage device comprises an anode comprising a negative electrode active material including a negative electrode redox-active polymer and configured to be oxidized during a discharging operation, wherein the negative electrode redox-active polymer is an n-type polymer. The device further comprises a positive electrode active material comprising a positive electrode redox-active polymer and configured to be reduced during the discharging operation. The positive electrode redox-active polymer is a p-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state. The device further comprises an electrolyte material interposed between the negative electrode active material and positive electrode active material, the electrolyte material comprising an ionically conductive polymer and configured to conduct the mobile cationic species therethrough from the negative electrode active material to the positive electrode active material during the discharging operation. In some embodiments, the negative electrode active material is further configured to be reduced during a charging operation, the positive electrode active material is further configured to be oxidized during the charging operation, and the electrolyte material is further configured to conduct the mobile cationic species from the positive electrode active material towards the negative electrode active material during the charging operation. The first embodiment is described in detail with respect to FIGS. 1(a) and 1(b). FIGS. 1(a) and 1(b) depict an electrochemical cell 10a/10b comprising a negative electrode 12 comprising an n-type polymer unit 14a/14b and a positive electrode 16 comprising a self-compensated p-type polymer unit 18a/18b which includes a self-compensating zwitterionic polymer unit, undergoing electrochemical redox processes during (a) a discharge operation and (b) a charge operation, respectively, according to some embodiments.

Referring to the discharge process depicted in FIG. 1(a), the n-type polymer 14a/14b comprises a negative electrode redox active polymer and is configured to be oxidized from an anionic state 14a towards a neutral state 14b. As electrons flow from the negative electrode 12 to the positive electrode 16 through an external circuit to power the a load 22 (L), mobile cations M+ migrate out of the bulk of the negative electrode n-type polymer unit 14a/14b towards the positive electrode through an electrolyte material 20 interposed between the negative electrode 12 and positive electrode 16. The positive electrode 16 comprises a self-compensated redox-active polymer which during a discharge operation, may be reduced from a zwitterionic state 18a towards an anionic state 18b while charge compensation is facilitated by the mobile counterion M+.

Referring to FIG. 1(b), during a charge process, the n-type polymer 14a/14b comprising the negative electrode redox active polymer is configured to be reduced from the neutral state 14b towards the anionic state 14a, wherein charge compensation is facilitated by the mobile counterion M+ migrating out of the bulk of the positive electrode 16 comprising the self-compensated p-type polymer unit 18a/18b towards the negative electrode 12 through the electrolyte 20. Electrons flow from the positive electrode 16 to the negative electrode 12 via an external power source 24 (PS). During the charge process, the positive electrode 16 comprising the p-type polymer unit 18a/18b including the self-compensating zwitterionic polymer unit is oxidized from the anionic state 18b to the zwitterionic state 18a, wherein the charge is compensated internally within the polymer unit itself via "self-compensation."

Figure 2A:
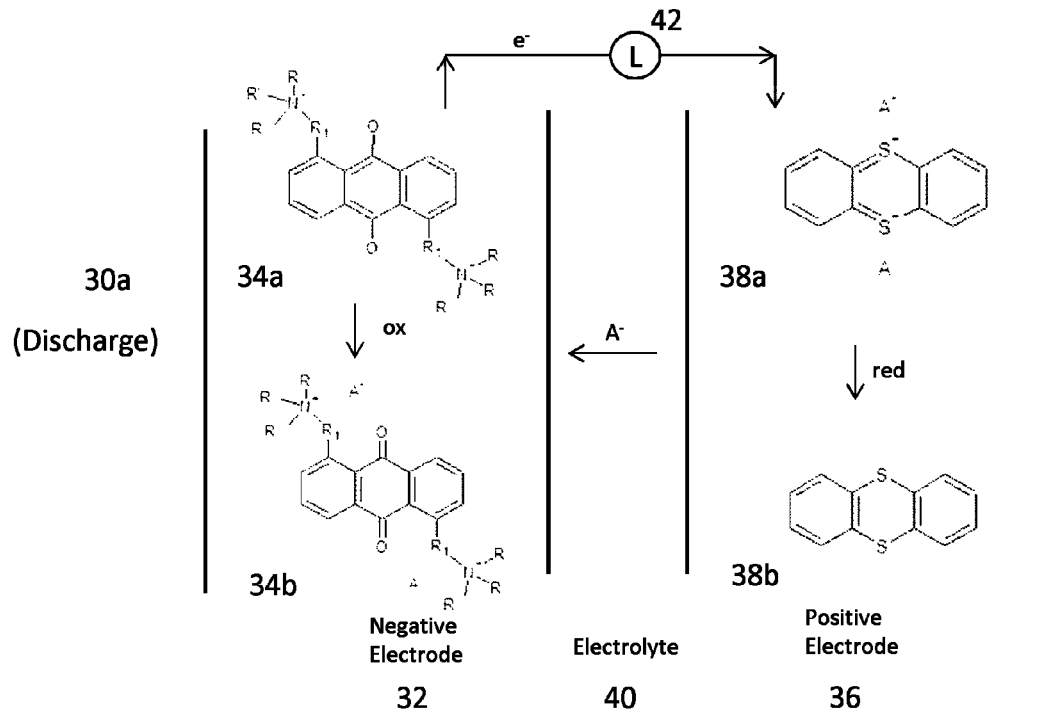
FIGS. 2(a) and 2(b) depict an electrochemical cell comprising a negative electrode comprising a self-compensated n-type polymer including a zwitterionic polymer unit and a positive electrode with a p-type polymer, undergoing electrochemical redox processes during (a) a discharge operation and (b) a charge operation, respectively, according to some other embodiments.
Figure 2B:
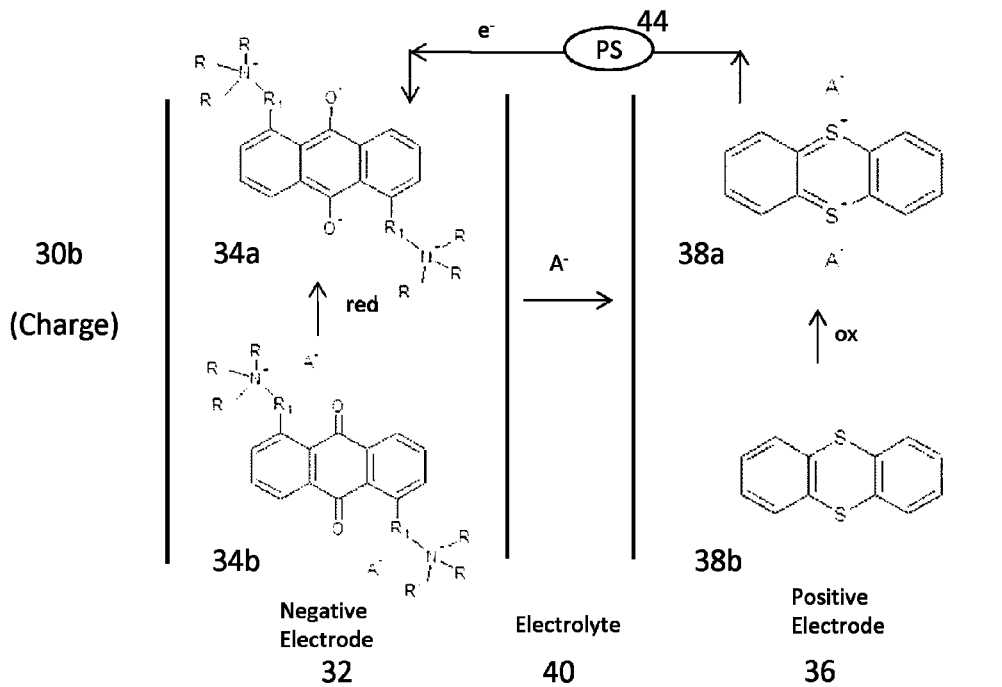

In a second embodiment, an electrochemical energy storage device comprises an anode comprising a negative electrode active material including a negative electrode redox-active polymer and configured to be oxidized during a discharging operation, wherein the negative electrode redox-active polymer is an n-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile anionic species in the cationic state. The device additionally comprises a positive electrode active material comprising a positive electrode redox-active polymer and configured to be reduced during the discharging operation, wherein the positive electrode redox-active polymer is a p-type polymer. The device further comprises an electrolyte material interposed between the negative electrode active material and positive electrode active material, the electrolyte material comprising an ionically conductive polymer and configured to conduct the mobile anionic species therethrough from the negative electrode active material to the positive electrode active material during the discharging operation. In some embodiments, the negative electrode active material is further configured to be reduced during a charging operation, the positive electrode active material is further configured to be oxidized during the charging operation, and the electrolyte material is further configured to conduct the mobile anionic species from the positive electrode active material towards the negative electrode active material during the charging operation. The second embodiment is described in detail with respect to FIGS. 2(a) and 2(b). FIGS. 2(a) and 2(b) depict an electrochemical cell 30a/30b comprising a negative electrode 32 comprising a self-compensated n-type polymer unit 34a/34b including a zwitterionic polymer unit and a positive electrode 36 with a p-type polymer, undergoing electrochemical redox processes during (a) a discharge operation and (b) a charge operation, respectively, according to some other embodiments.

Referring to the discharge process depicted in FIG. 2(a), the self-compensated n-type polymer unit 34a/34b including the zwitterionic polymer unit is configured to be oxidized from a neutral zwitterionic state 34a towards a cationic state 34b and charge compensation is facilitated by the mobile counter-anion K. As electrons flow from the negative electrode 32 to the positive electrode 36 through an external circuit to power a load 42 (L), the mobile anions K migrate out of the bulk of the positive electrode 38 comprising the p-type polymer towards the negative electrode 32 through an electrolyte material 40. The positive electrode 36 comprises the p-type polymer comprising a redox-active polymer unit 38a/38b that is configured to be reduced from a cationic state 38a towards a neutral state.

Referring to FIG. 2(b), during a charge process, the n-type polymer unit 34a/34b comprising the redox-active polymer is configured to be reduced from the cationic state 34b to the neutral zwitterionic state 34a, wherein charge is compensated internally within the polymer unit itself via "self-compensation." The positive electrode 36 comprises a p-type redox active polymer unit 38a/38b that is configured to be oxidized from the neutral state 38b to the cationic state 38a wherein charge compensation is facilitated by the mobile counterion K migrating out of the bulk of the negative electrode 32 comprising the n-type polymer through the electrolyte 40. Electrons flow from the positive electrode 36 to the negative electrode 32 via an external power source 44 (PS).

Figure 3A:
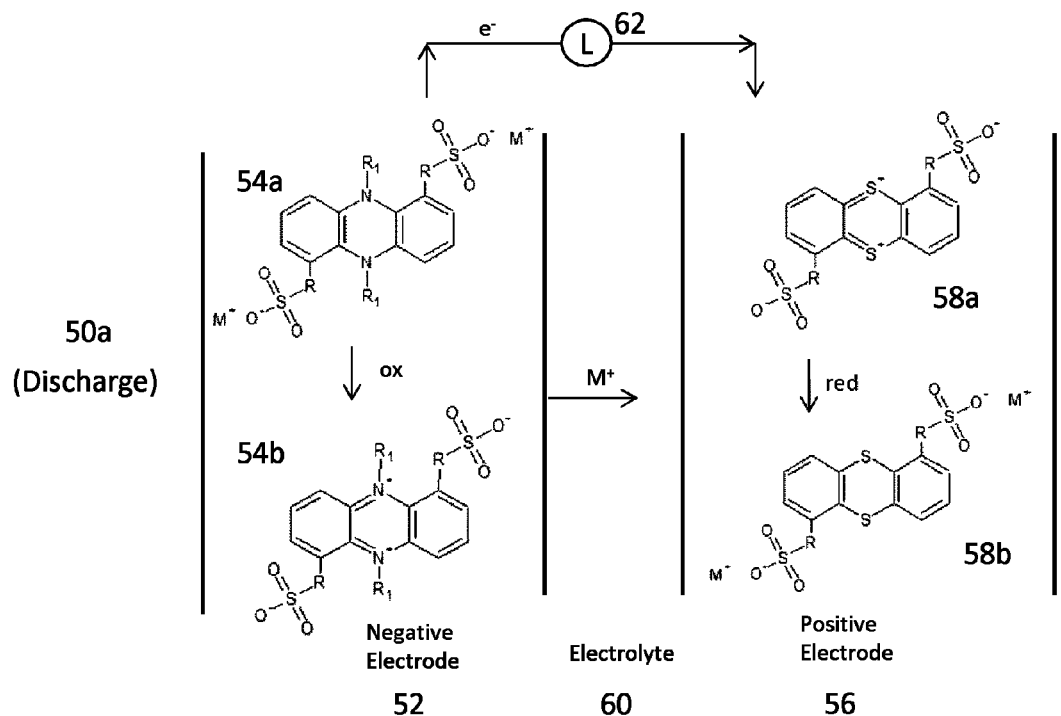
FIGS. 3(a) and 3(b) depict an electrochemical cell comprising a negative electrode comprising a first self-compensated p-type polymer including a first zwitterionic polymer unit and a positive electrode comprising a second self-compensated p-type polymer including a second zwitterionic polymer unit, undergoing electrochemical redox processes during (a) a discharge operation and (b) a charge operation, respectively, according to yet some other embodiments.
Figure 3B:
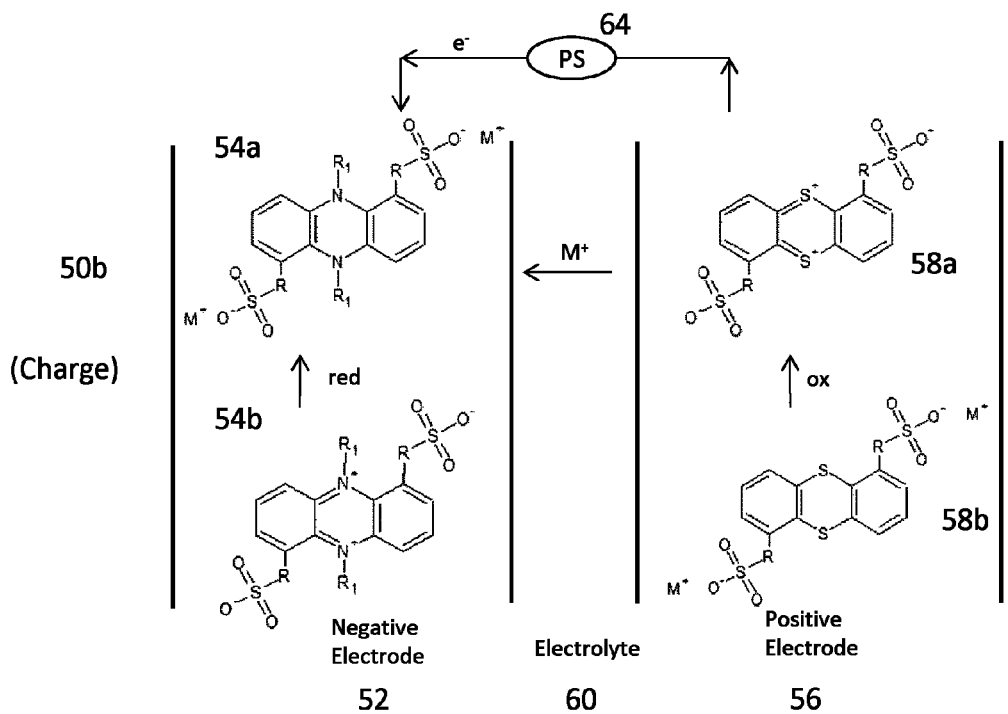

In a third embodiment, an electrochemical energy storage device comprises an anode comprising a negative electrode active material including a negative electrode redox-active polymer and configured to be oxidized during a discharging operation, wherein the negative electrode redox-active polymer is a p-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state. The device additionally comprises a cathode comprising a positive electrode active material including a redox-active polymer and configured to be reduced during the discharging operation, wherein the positive electrode redox-active polymer is a p-type polymer comprising a zwitterionic polymer unit configured to reversibly switch between a zwitterionic state in which the zwitterionic polymer unit has third and fourth charge centers having opposite charge states that compensate each other, and a non-zwitterionic state in which the zwitterionic polymer unit has one of the third and fourth charge centers whose charge state is compensated by the mobile cationic species in the anionic state. The device further comprises an electrolyte material interposed between the negative electrode active material and the positive electrode active material, the electrolyte material comprising an ionically conductive polymer configured to conduct the mobile cationic species therethrough from the negative electrode active material to the positive electrode active material during the discharging operation. In some embodiments, the negative electrode active material is further configured to be reduced during a charging operation, the positive electrode active material is further configured to be oxidized during the charging operation, and the electrolyte material is further configured to conduct the mobile cationic species from the positive electrode active material towards the negative electrode active material during the charging operation. The third embodiment is described in detail with respect to FIGS. 3(a) and 3(b). FIGS. 3(a) and 3(b) depict an electrochemical cell comprising a negative electrode 52 comprising a first self-compensated p-type polymer unit 54a/54b including a first zwitterionic polymer unit and a positive electrode 56 comprising a second self-compensated p-type polymer unit 58a/58b including a second zwitterionic polymer unit, undergoing electrochemical redox processes during (a) a discharge and (b) a charge operation, respectively, according to yet some other embodiments.

Referring to the discharge process depicted in FIG. 3(a), the first self-compensated p-type polymer unit 54a/54b of the negative electrode 52 is configured to be oxidized from an anionic state 54a to a neutral zwitterionic state 54b, wherein charge is compensated by mobile counterion $M^+$. As electrons flow from the negative electrode to the positive electrode through an external circuit to power a load 62 (L), mobile cations $M^+$ (e.g. $H^+$, $Li^+$) migrate out of the bulk of the negative electrode 52 towards the second p-type polymer 58a/58b of the positive electrode 56 through the electrolyte material 60 interposed between the negative electrode 52 and positive electrode 56. The second p-type polymer 54a/54b of the positive electrode 56 is configured to be self-compensated as it is reduced towards the anionic state 58b while charge compensation is facilitated by the mobile counterion $M^+$.

Referring to the charge process depicted in FIG. 3(b), the first self-compensated p-type polymer unit 54a/54b of the negative electrode 52 is reduced from a neutral zwitterionic state 54b towards the anionic state 54a, wherein charge compensation is facilitated by the mobile counterion $M^+$ migrating out of the bulk of the positive electrode 56 p-type polymer towards the negative electrode 52 through the electrolyte material 60. Electrons are conducted from the positive electrode to the negative electrode via an external power source 64 (PS).

The present disclosure facilitates the pairing of any p-type and n-type polymers in an electrochemical cell by incorporating any redox-active polymer configured to form a zwitterionic into at least one of the p-type and n-type polymers. Thus, a wide range of redox-active polymers may be employed. Furthermore, providing certain zwitterionic polymer units allows one to tune the system specifically for redox potential.

Advantageously, in various embodiments of electrochemical energy storage devices (e.g., battery cells) the mobile counterion comprise a single mobile ionic species that compensates charge states associated with non-zwitterionic states of one or both of the negative electrode redox-active polymer and the positive electrode redox-active polymer. Thus, the need for one ionic species (e.g., a mobile cationic species) to compensate for the charge associated with the redox process of one of the electrodes (e.g., n-type polymer of an anode switching between a neutral and anionic state) and another ionic species (e.g., a mobile anionic species) to compensate for the charge associated with the redox process of another one of the electrodes (e.g., p-type polymer of a cathode switching between a neutral and cationic state). That is, when a mobile cationic species is present, mobile anionic species may not be present, while when a mobile anionic species is present, mobile cationic species may not be present. These characteristics enable a substantial reduction in volume changes, as described above.

In some embodiments, the negative electrode redox-active polymer has a first redox potential and the positive electrode redox-active polymer has a second redox potential greater than the first redox potential by greater than about 200 mV, greater than about 600 mV, or greater than about 1V.

In some embodiments, the negative electrode active material and the positive electrode active material each has an electrical conductivity greater than about $10^{-6}$ S/cm, greater than about $10^{-4}$ S/cm, or greater than about $10^{-3}$ S/cm.

In some embodiments, the negative electrode active material and the positive electrode active material each has an ionic conductivity greater than about greater than about $10^{-6}$ S/cm, greater than about $10^{-4}$ S/cm, or greater than about $10^{-3}$ S/cm.

In some embodiments, the zwitterionic polymer unit comprises a structural group comprising a repeating heterocyclic aromatic structure including two heteroatoms para to each other, wherein each of the heteroatoms is selected from the group consisting of oxygen (O), carbonyl, sulfur (S), nitrogen (N), and functionalized N.

In some embodiments, the heterocyclic aromatic structure further comprises a compensating substituent, such that the heteroatoms and the compensating substituent forms the first and second charge centers having opposite charge states that compensate each other.

In some embodiments, the compensating substituent has relatively high ratio of electron withdrawing character or electron-donating character to substituent mass. Not to be bound by any particular theory, but the electron withdrawing character may, for example, be informed by a particular substituent's Hammett parameter. The Hammett parameter is an empirical electronic substituent parameter which describes observed electronic effects (inductive and resonance electronic effects) that a substituent imparts to a conjugated structure. The Hammett parameter is positive if it is electron withdrawing or negative if it is electron donating.

For example, one may calculate the ratio of Hammett parameter to molecular weight of a substituent as in the table below:

| Substituent | Hammett parameter | Molecular weight | Ratio |
|---|---|---|---|
| NO | 0.91 | 26 | 0.035 |
| CN | 0.66 | 26.01 | 0.02537486 |
| N(CH3)3+ | 0.82 | 44.06 | 0.01861099 |
| NO2 | 0.78 | 46 | 0.01695652 |
| CHO | 0.42 | 29.02 | 0.01447278 |
| COCH3 | 0.5 | 43.05 | 0.0116144 |
| CO2H | 0.45 | 45.02 | 0.00999556 |
| CF3 | 0.54 | 69.01 | 0.00782495 |
| Cl | 0.23 | 35.45 | 0.00648801 |
| SH | 0.15 | 33.11 | 0.00453035 |
| SO3 | 0.35 | 80 | 0.004375 |
| F | 0.06 | 19 | 0.00315789 |
| Br | 0.23 | 79.9 | 0.0028786 |
| CH2Cl | 0.12 | 61.49 | 0.00195154 |
| I | 0.18 | 126.9 | 0.00141844 |
| H | 0 | 1.01 | 0 |
| SCH3 | 0 | 35.13 | 0 |
| NHCHO | 0 | 44.03 | 0 |
| C6H5 | −0.01 | 77.11 | −0.0001297 |
| H2C=CH | −0.02 | 27.05 | −0.0007394 |
| Si(CH3)3 | −0.07 | 73.09 | −0.0009577 |
| C5H11 | −0.15 | 71.16 | −0.0021079 |
| NHCOCH3 | −0.15 | 58.06 | −0.0025835 |
| n-C4H9 | −0.16 | 57.13 | −0.0028006 |
| n-C3H7 | −0.13 | 43.1 | −0.0030162 |
| i-C3H7 | −0.15 | 43.1 | −0.0034803 |
| t-C4H9 | −0.2 | 57.13 | −0.0035008 |
| C2H5 | −0.15 | 29.07 | −0.00516 |
| OCH2CH3 | −0.24 | 44.06 | −0.0054471 |
| OCH3 | −0.27 | 31.04 | −0.0086985 |
| CH3 | −0.17 | 15.04 | −0.0113032 |
| N(CH3)2 | −0.83 | 44.06 | −0.0188379 |
| OH | −0.37 | 17.01 | −0.0217519 |
| NH2 | −0.66 | 16.02 | −0.0411985 |

In some embodiments, the ratio of Hammett parameter to molecular weight of a substituent is between about 0.05 and about −0.05. In some other embodiments, the ratio of Hammett parameter to molecular weight of a substituent is less than about 0.05 or greater than about −0.05.

In some embodiments, the ratio of electron withdrawing character to substituent mass is selected to be between about 0 and about 0.10, or between about 0 and about 0.05. In some embodiments, the ratio of electron donating character to substituent mass is selected to be between about 0 and about −0.10, or between about 0 and about −0.05.

In some embodiments, the compensating substituent is selected to form a charge stabilizing structure. In an embodiment, R of the compensating substituent may be selected to form a six-membered ring in the zwitterionic compensated structure, thereby imparting stability. For example, if the heteroatom is located within the in ring structure (e.g. phenothiazine, thianthrene, phenazine) R should be at least two carbon atoms. As another example, or heteroatom outside of ring (e.g. quinone structures) R should be at least one carbon as depicted below:

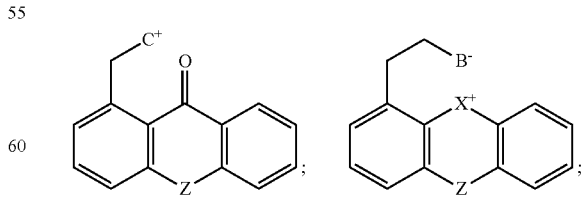

The compensating substituent can be selected such that it remains in the charge state (either anionic or cationic) during battery cycling so that the redox active center remains as the heteroatom. In embodiments where the compensating substituent is configured to form an anionic species, a redox potential corresponding to a transition of the compensating substituent from an anionic to a neutral state is selected to be greater than the a redox potential corresponding to a transition of the heteroatom from a neutral to a cationic state. In embodiments where the compensating substituent is configured to form a cationic species, a redox potential corresponding to a transition of the compensating substituent from a cationic to a neutral state is selected to be less than a redox potential corresponding to a transition of the heteroatom from a neutral state to an anionic state.

The redox active polymer is capable of forming a quinoid species with any suitable electron-withdrawing or electron-donating group R1 or R2 and polymerized either in the main chain or as a pendant group:

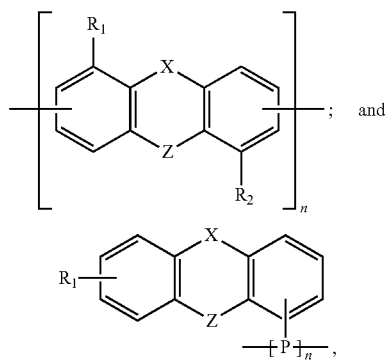

where n is the number of repeated subunits of the polymer having a value between about 1 to about 100,000, between about 10 and about 50,000, or between about 25 and about 10,000; P is a suitable conductive polymer backbone, for example, polyphenylene, polypyrrole, polythiophene, polyaniline, polyacetylene derivative or combinations thereof.

In some embodiments, the at least one of the redox-active polymers comprise a structural group selected from the group consisting of quinones, phenothiazines, N-functionalized phenothiazines, thianthrenes, phenozines, phenoxazine, phenoxathiin, dihydrophenazine, dialkyldihydrophenazine, dibenzodioxin, benzofurans, benzodifurans, imides, phthalimides, N-functionalized pthalimides, their derivatives and combinations thereof.

In some embodiments, the zwitterionic polymer unit comprises a structural group selected from the group consisting of:

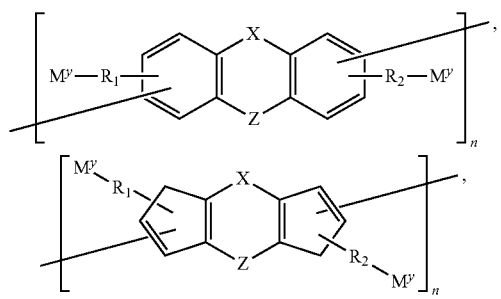

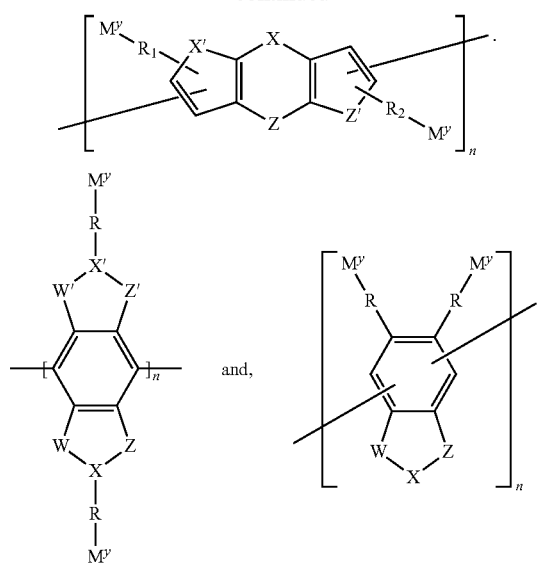

As described herein, a heteroatom (e.g., N, S) that is functionalized refers to a heteroatom having a charge-compensating molecule, referred to herein as a charge compensating substituent, attached thereto. As an example, the nitrogen atom of N—$(CH_2)_n$—$PO_3$ is a functionalized heteroatom, and $(CH_2)_n$—$PO_3$ is the charge compensating substituent. In various embodiments, the heteroatoms and the compensating substituent can form first and second charge centers having opposite charge states that compensate each other.

In these embodiments, W, W', X, X', Z and Z' are heteroatoms independently selected from the group consisting of oxygen, carbonyl, nitrogen, functionalized nitrogen and sulfur, M is an anion or cation selected from the group consisting of sulfate, phosphate, phosphonate, carboxylate, ammonium, halogenide, sulfonate, hydroxamate, trifluoroborate, acetate, imide, perchlorate, borate, nitro, halogen, cyano, sulfonyl, cyanate, isocyano, sulfonium, phosphonium, carbanion and carborane, and R1 and R2 are independently selected from the group consisting of hydrogen, linear or branched and saturated or unsaturated C1-C6 alkyl or ether chain.

In some embodiments, the zwitterionic polymer unit comprises a structural group selected from the group consisting of:

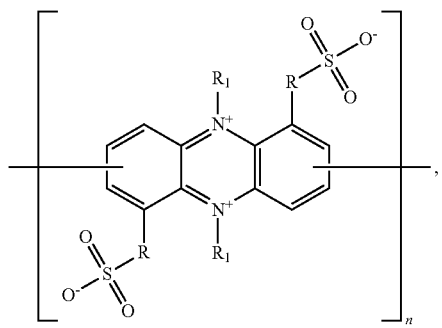

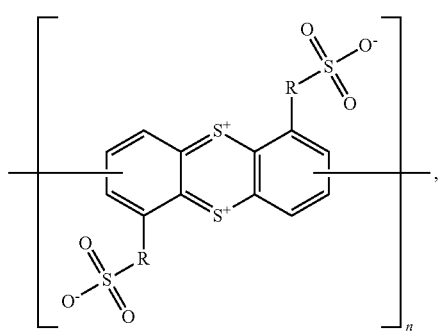

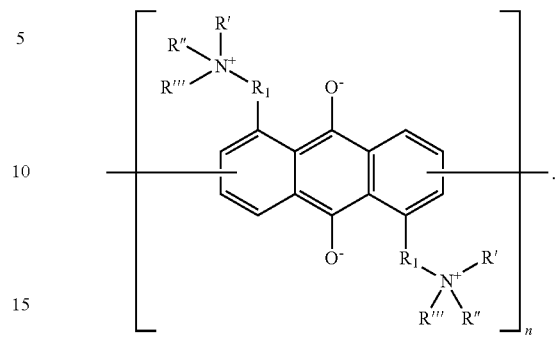

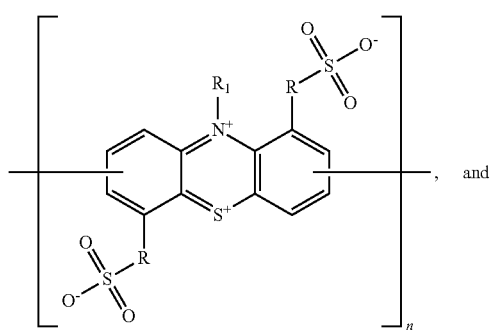

, and

In these embodiments, each of R, $R_1$, R', R" and R'" is a hydrogen atom or one of a C1-C6 alkyl chain or a C1-C6 ether chain that is linear or branched and saturated or unsaturated, and n is the number of repeated subunits of the polymer having a value between about 1 to about 100,000, between about 10 and about 50,000, or between about 25 and about 10,000.

In some embodiments, the zwitterionic polymer unit comprises a structural group selected from the group consisting of a $PO_3$-compensated phenothiazine polymer, a $PO_3$-compensated phenothiazine-aniline copolymer, a $PO_3$-compensated phenothiazine-thiophene block copolymer, a $PO_3$-compensated phenothiazine-thiophene random copolymer and a $PO_3$-compensated phenothiazine-thiophene cross-linked copolymer, represented by respective chemical formulas:

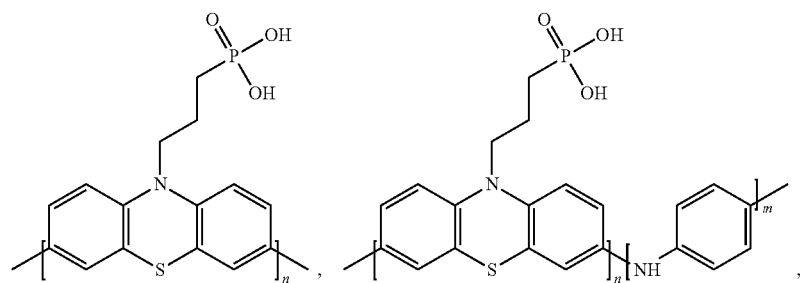

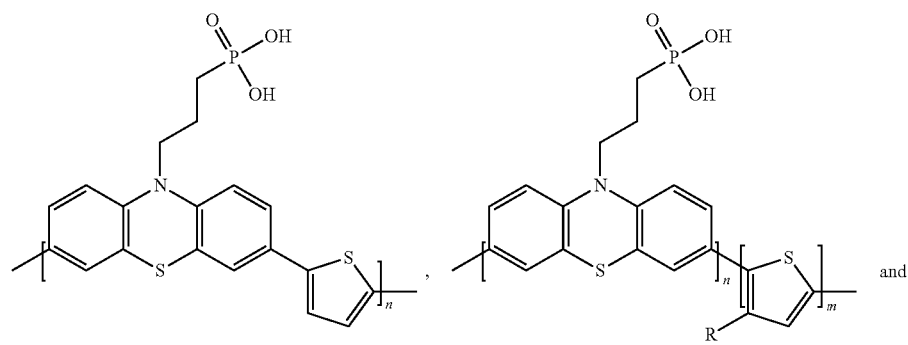

and

-continued

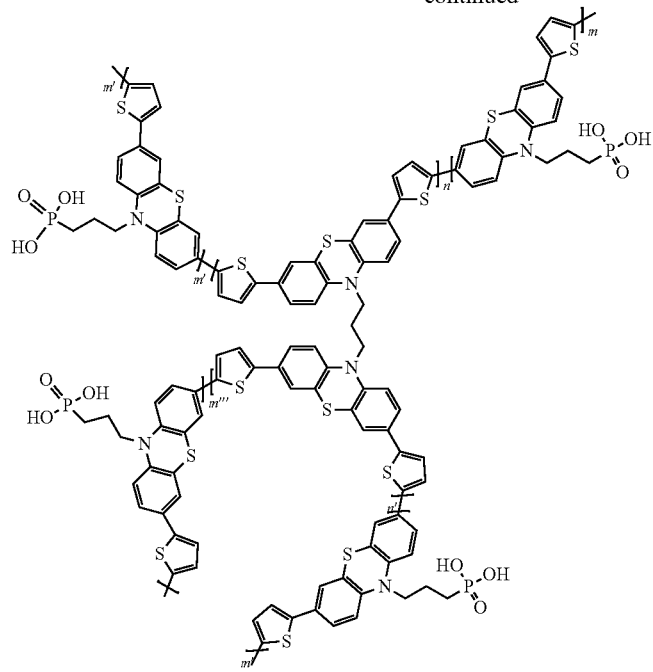

wherein each of m and n is an integer representing repetition of respective subunits of the structural group between 1 and about 100,000, between about 10 and about 50,000, or between about 25 and about 10,000, wherein a ratio of m:n can be between about 0.5 and about 2.0, between 0.8 and about 1.2, or between about 0.9 and about 1.1, for instance about 1:1. It will be understood that, where a copolymer is represented as "$A_xB_y$," each of x and y independently represents a value between about 1 and about 100,000, between about 10 and about 50,000, or between about 25 and about 10,000. Furthermore, the unit "$A_xB_y$" itself can repeat such that the polymer can be represented as "$[A_xB_y]_z$," where z has a value between 1 and about 100,000, between about 10 and about 50,000, or between about 25 and about 10,000.

Figure 4:
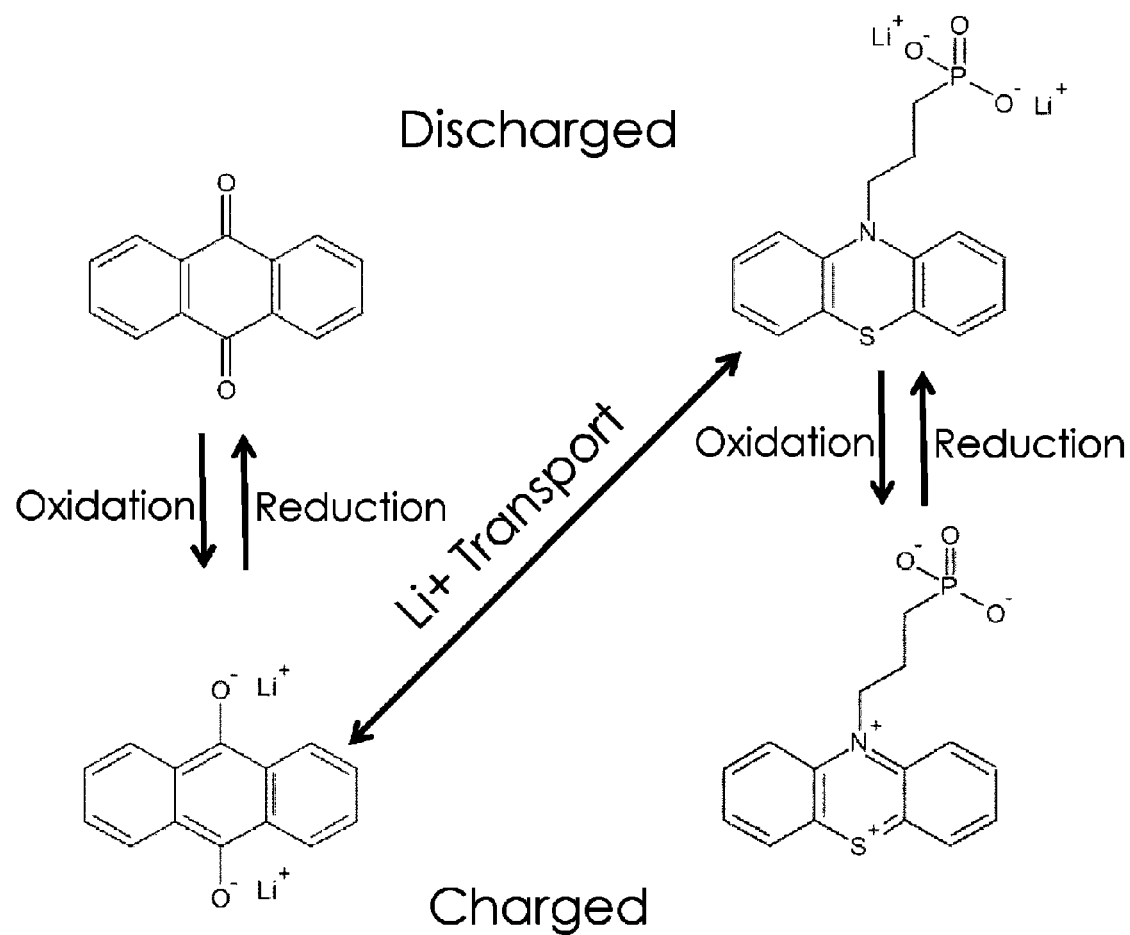
FIG. 4 depicts an electrochemical cell comprising a negative electrode comprising an n-type polymer and a positive electrode comprising a self-compensated p-type polymer which includes a zwitterionic polymer unit, undergoing electrochemical redox processes during a discharge operation and a charge operation, according to some embodiments.

FIG. 4 depicts an electrochemical cell in a configuration analogous to that of FIGS. 1(a) and 1(b). In FIG. 4, the left side corresponds to a negative electrode comprising an n-type polymer unit and the right side corresponds to a positive electrode comprising a self-compensated p-type polymer unit which includes a self-compensating zwitterionic polymer unit. In the illustrated embodiment of FIG. 4, the self-compensating zwitterionic polymer unit includes one of $PO_3$-compensated phenothiazine-based polymer molecules disclosed above. Similar to the electrochemical cell described above with respect to FIGS. 1(a) and 1(b), FIG. 4 illustrates the $PO_3$-compensated phenothiazine-based polymer molecule undergoing electrochemical redox processes between a discharged state (upper) and a charged state (lower), respectively, according to some embodiments.

Similar FIGS. 1(a) and 1(b), in FIG. 4, during a discharge/charge process, the n-type polymer (left) comprising a negative electrode redox active polymer and is configured to be oxidized/reduced from/to an anionic state (lower left) to/from a neutral state (upper left). As electrons flow between the negative electrode (left) and the positive electrode (right), mobile cations (e.g., $Li^+$) migrate through an electrolyte material (not shown). During the discharge/charge process, the positive electrode (right) comprising the p-type polymer unit including the $PO_3$-compensated phenothiazine-based polymer molecule is reduced/oxidized from/to a zwitterionic state (lower right) to/from an anionic state (upper right). In the zwitterionic state, the charge of the $PO_3$-compensated phenothiazine-based polymer molecule is compensated internally within the polymer unit itself via "self-compensation," while in the non-zwitterionic (anionic) state the charge is compensated by the mobile $Li^+$.

In some embodiments, the zwitterionic species may be stabilized by a suitable method. For example, charge screening may be accomplished by the addition of an additive like a small polar molecule, a low dielectric additive, a different charge compensating polymer, a derivative or combination thereof. A suitable salt may be mixed in the polymeric matrix to stabilize and/or screen the charge. As another example, the polymer may be crystallized or otherwise oriented such that opposite charges of the polymer system is oriented in such a way as to facilitate charge relaxation.

In some embodiments, the at least one of the negative electrode active material and the positive electrode active material further comprises a low dielectric additive configured to screen a zwitterionic charge. Examples of the low dielectric additive include plasticizers, ionic liquids, organic solvents. The low dielectric additive can advantageously selected to have a dielectric constant less than about 10, or less than about 8.

For example, any organic solvent known in the art may be used including but not limited to: acetonitrile, n-methylpyrrolidione, dimethylformamide, dimethylsulfoxide, tetrahydrofuran, and so on.

For example, any ionic liquid known in the art may be used including but not limited to: tetramethylammonium salts, or more generally tetraalkylammonium salts, or tetraorganoammonium salts, organoamines, imidazolium salts, pyridinium salts, and so on.

For example, any suitable plasticizer known to those skilled in the art may be used including but not limited to:

Phthalates: Bis(2-ethylhexyl) phthalate (DEHP), Diisononyl phthalate (DINP), Di-n-butyl phthalate (DnBP, DBP), Butyl benzyl phthalate (BBzP), Diisodecyl phthalate (DIDP), Dioctyl phthalate (DOP or DnOP), Diisooctyl phthalate (DIOP), Diethyl phthalate (DEP), Diisobutyl phthalate (DIBP), Di-n-hexyl phthalate, Dioctyl terephthalate (DEHT); Trimellitates: Trimethyl trimellitate (TMTM), Tri-(2-ethylhexyl)trimellitate (TEHTM-MG), Tri-(n-octyl,n-decyl)trimellitate (ATM), Tri-(heptyl,nonyl)trimellitate (LTM), n-octyl trimellitate (OTM); Adipates: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM); Sulfonamides: N-ethyl toluene sulfonamide (ortho and para isomers ETSA), N-(2-hydroxypropyl)benzene sulfonamide (HP BSA), N-(n-butyl)benzene sulfonamide (BBSA-NBBS); Phosphates: Tricresyl phosphate (TCP), Tributyl phosphate (TBP); Citrates: Triethyl citrate (TEC), Acetyl triethyl citrate (ATEC), Tributyl citrate (TBC), Acetyl tributyl citrate (ATBC), Trioctyl citrate (TOC), Acetyl trioctyl citrate (ATOC), Trihexyl citrate (THC), Acetyl trihexyl citrate (ATHC), Butyryl trihexyl citrate (BTHC, trihexyl o-butyryl citrate), Trimethyl citrate (TMC); Other plasticizers: Benzoates, 1,2-Cyclohexane dicarboxylic acid diisononyl ester, Epoxidized vegetable oils, alkyl sulphonic acid phenyl ester (ASE), Triethylene glycol dihexanoate (3G6, 3GH), Tetraethylene glycol diheptanoate (4G7).

In some embodiments, the at least one of the negative electrode active material and the positive electrode active material further comprises a charge compensating polymer configured to screen a zwitterionic charge. Examples of the charge compensating additives or polymers include ionic liquids, organic solvents (e.g. NMP, acetonitrile), polymer derivative of small molecule organic solvents, derivatives or combinations thereof. For example, charge compensating polymers may be non-conductive polyvinylstyrene, polyacrylic acid, polystyrene, polystyrenesulfonate, polyvinylbenzoate, polyvinylbenzohydroxamate, polystenetrifluoroborate, polyanilinesulfone, polyphenylsulfonate, ammonium polystyrene, ammonium polyvinylstyrene, derivatives and combinations thereof.

Figure 5:
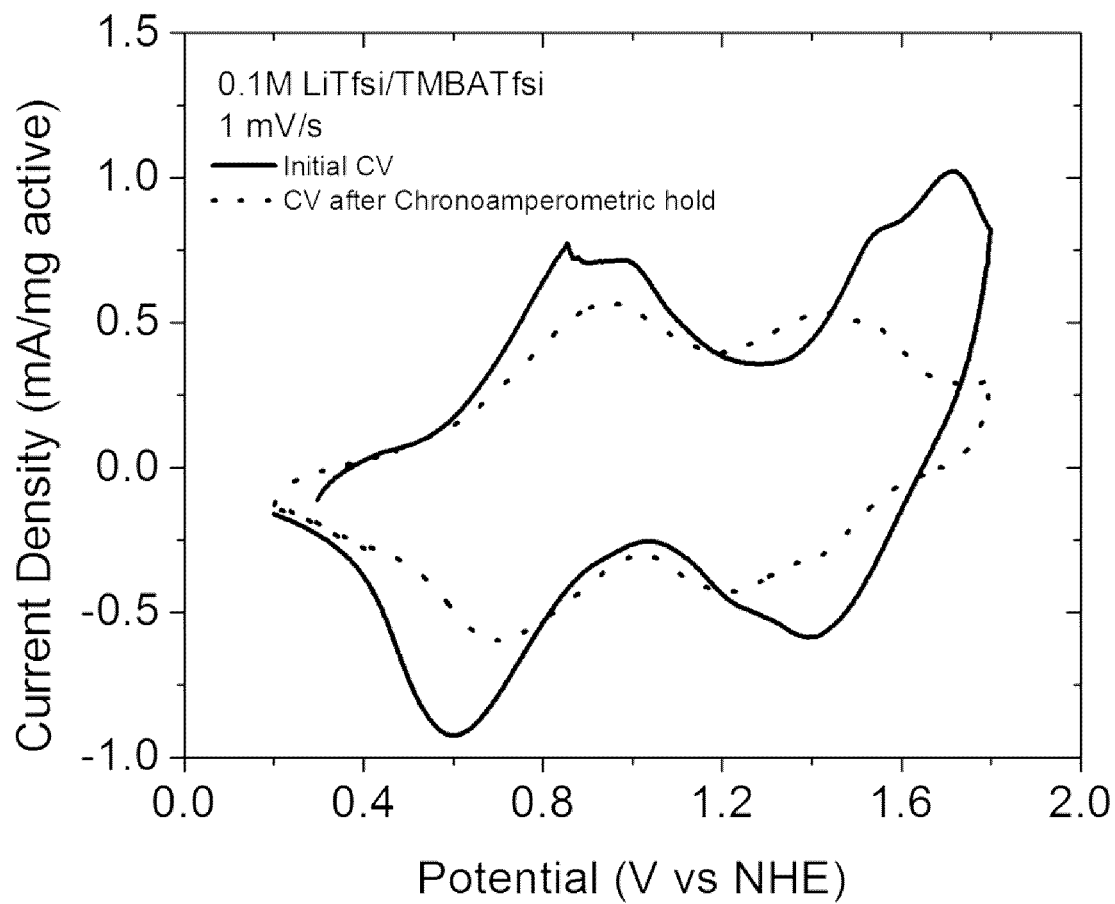
FIG. 5 illustrates cyclic voltammograms showing current-voltage characteristics of an electrochemical cell comprising a self-compensated polymer which includes a zwitterionic polymer unit, according to embodiments.

FIG. 5 illustrates cyclic voltammograms showing current-voltage characteristics of an electrochemical cell comprising a self-compensated polymer which includes a zwitterionic polymer unit, according to embodiments. The illustrated voltammograms were obtained from an electrochemical cell in a three electrode cell configuration having a $PO_3$-compensated phenothiazine-aniline copolymer as an active electrode material for the working electrode. The solid curve represents an initial sweep and the dotted curve represents a subsequent sweep after a chronoamperometric hold under at 1.7V vs. NHE for one hour to oxidize the active electrode material, similar to the hold conditions described with respect to FIG. 6 below. The electrolyte used was 0.1M lithium bis(trifluoromethanesulfonyl)imide (LiTFSI) in trimethyl butyl ammonium TFSI. As illustrated, the redox wave near about 0.7 V (between about 0.6 V and 0.8 V) corresponds to the aniline subunit of the copolymer and the redox waves near about 1.4 V (between about 1.3 V and 1.5V) and about 1.6 V (between about 1.5 V and about 1.7 V) correspond to the two-electron redox process for the compensated phenothiazine subunit of the polymer (two peaks visible).

Figure 6:
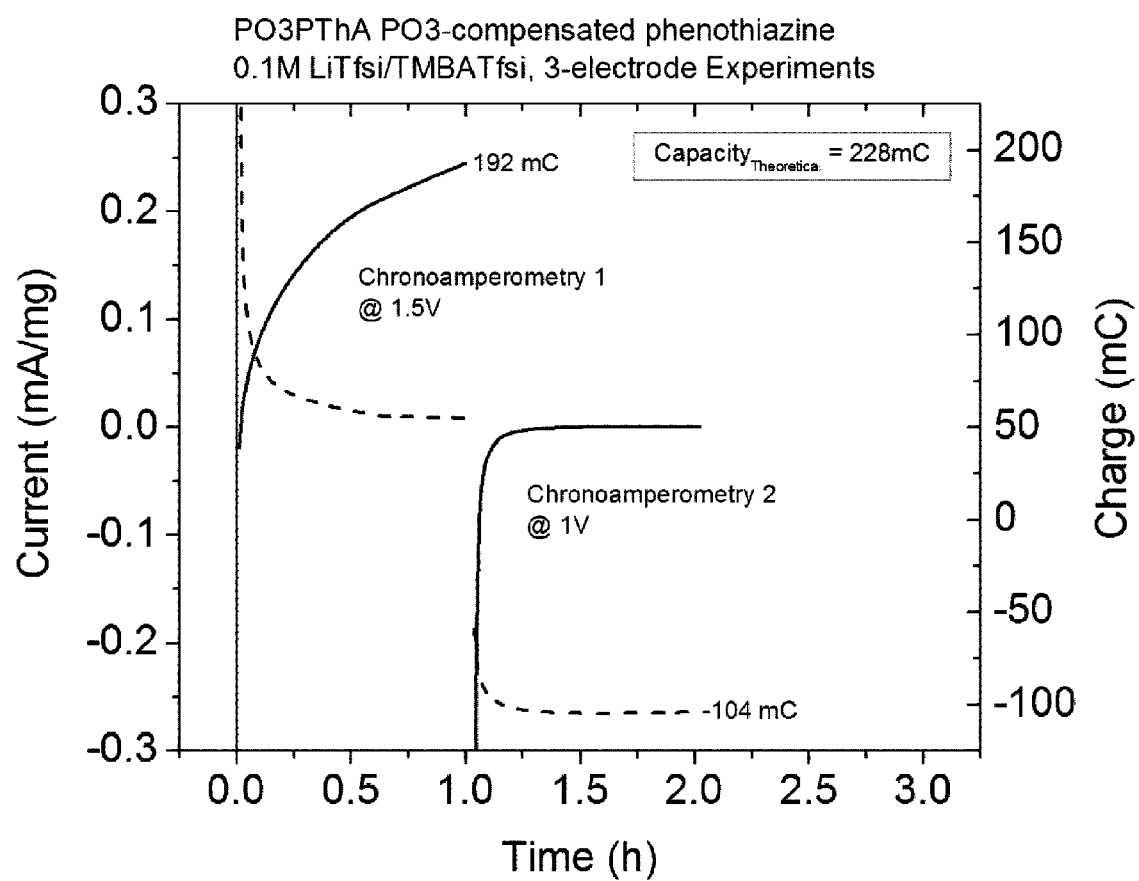
FIG. 6 illustrates chronoamperiometric curves showing current-time and charge-time characteristics of an electrochemical cell comprising a self-compensated polymer which includes a zwitterionic polymer unit, according to embodiments.

FIG. 6 illustrates chronoamperiometric curves showing current-time (left y-axis) and charge-time (right y-axis) characteristics of an electrochemical cell comprising a self-compensated polymer which includes a zwitterionic polymer unit, according to embodiments. The illustrated chronoamperiometric curves were obtained from an electrochemical cell in a three electrode cell configuration having a $PO_3$-compensated phenothiazine-aniline copolymer as an active electrode material for the working electrode. A curve whose value increases with time represents a current-time curve, while an adjacent curve whose value decreases with time represents a corresponding charge-time curve. The current-time/charge-time curve pair on the left represent a chronoamperometric hold to oxidize at 1.7V, which was followed by a chronoamperomentric hold at 1 volt to reduce, represented by the current-time/charge-time curve pair on the right. In the illustrated embodiment, the resulting charge retention is 54%, which may be lower than typical characteristic charge retention for similar systems, given the solubility of the active material in the flooded three electrode cell (however in a solid-state battery system, solubility may be avoided) as also evidenced by the smaller peaks in the CV after the chronoamperometric holds as illustrated in FIG. 5.

Figure 7A:
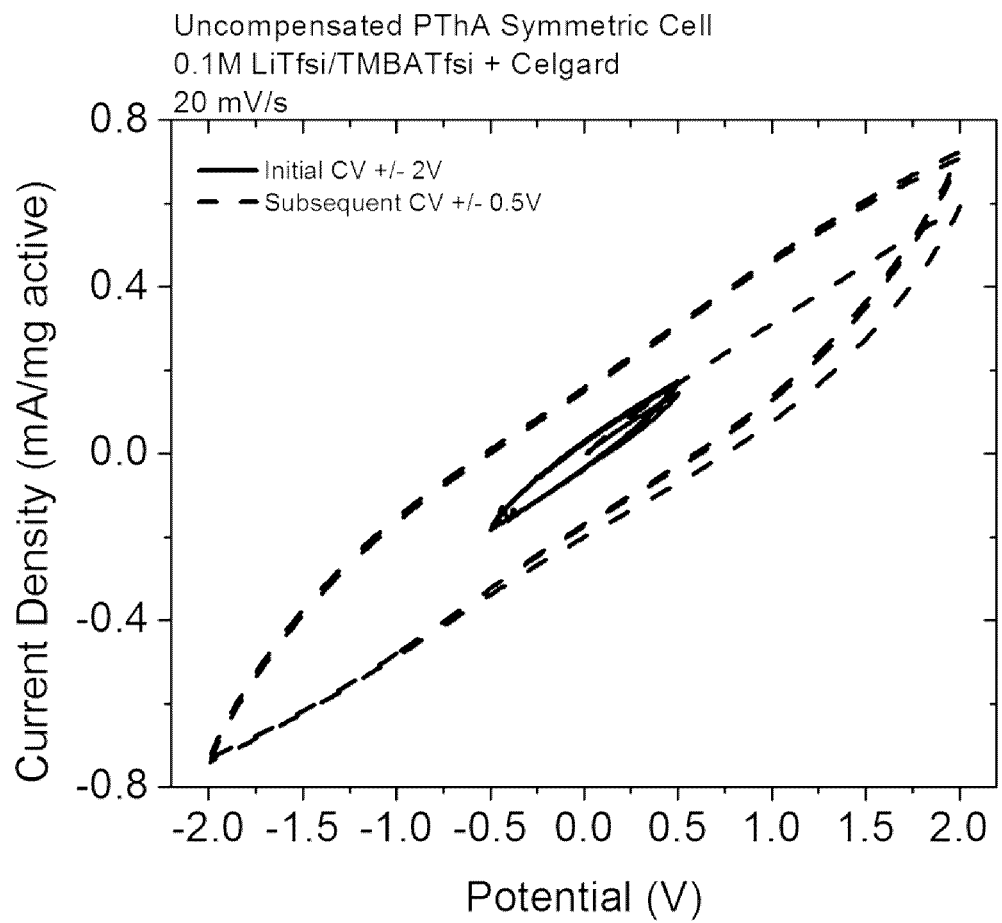
FIG. 7A illustrates cyclic voltammograms showing current-voltage characteristics of an electrochemical cell comprising an uncompensated polymer.
Figure 7B:
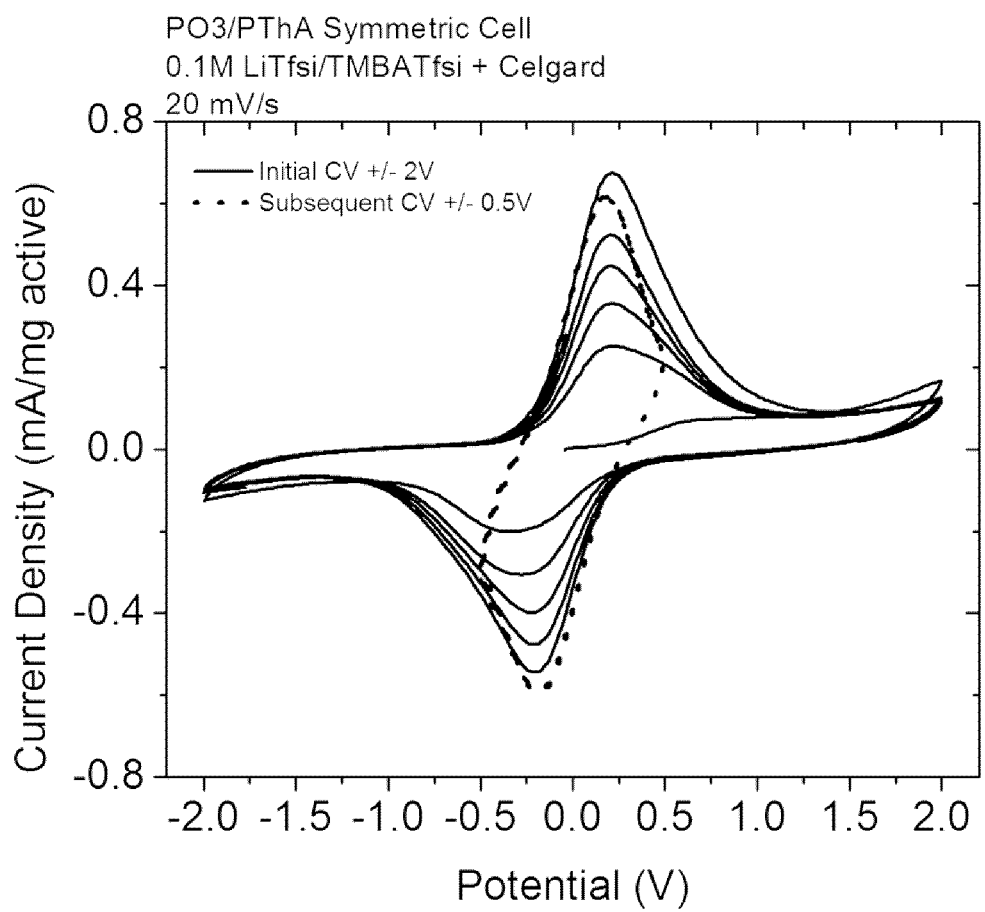
FIG. 7B illustrates cyclic voltammograms showing current-voltage characteristics of an electrochemical cell comprising a self-compensated polymer which includes a zwitterionic polymer unit, according to embodiments.

FIG. 7A illustrates cyclic voltammograms showing current-voltage characteristics of an electrochemical cell comprising an uncompensated polymer. By comparison, FIG. 7B illustrates cyclic voltammograms showing current-voltage characteristics of an electrochemical cell comprising a self-compensated polymer which includes a zwitterionic polymer unit, according to embodiments. The illustrated voltammograms were obtained from an electrochemical cell in a symmetric cell configuration having a $PO_3$-compensated phenothiazine-aniline copolymer as an active electrode material for the positive electrode. It will be appreciated that the technique employed to obtain the cyclic voltammograms of FIGS. 7A and 7B allows for an evaluation of the behavior of each particular electrode in the electrochemical cell by eliminating the effect of the other electrode to which it would be conventionally coupled in a battery. Comparing FIGS. 7A and 7B, the symmetric cell with an electrode having $PO_3$-compensated phenothiazine-aniline copolymer as an active electrode material (FIG. 7B) exhibits a relatively fast kinetics with minimal IR drop i.e. sharp onset current with onset potential close to zero volts. In contrast, the symmetric cell with an electrode having an uncompensated phenothiazine-aniline copolymer as an active electrode material (FIG. 7A) exhibits a significant resistance in the cyclic voltammogram. The cells were assembled in the discharged state. As the potential is swept away from zero, charge is added into the cell in an increasing manner. If the potential is kept +/−0.5V subsequent to addition of charge into the cell, charge transfer between the two identical electrodes in the absence of side reactions can be observed.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An electrochemical energy storage device, comprising:
   a negative electrode comprising a negative electrode redox-active polymer;

a positive electrode comprising a positive electrode redox-active polymer; and an electrolyte material interposed between the negative electrode and the positive electrode, wherein at least one of the positive and negative redox-active polymers comprises a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by one or more mobile counterions.

2. The electrochemical energy storage device of claim 1, wherein the negative electrode redox-active polymer has a redox potential lower than a redox potential of the positive electrode redox-active polymer by greater than about 200 millivolts.

3. The electrochemical energy storage device of claim 1, wherein the negative electrode redox-active polymer has a redox potential lower than a redox potential of the positive electrode redox-active polymer by greater than about 1 volt.

4. The electrochemical energy storage device of claim 1, wherein each of the negative electrode redox-active polymer and the positive electrode redox-active polymer has an electrical conductivity greater than about $10^{-6}$ S/cm.

5. The electrochemical energy storage device of claim 1, wherein each of the negative electrode redox-active polymer and the positive electrode redox-active polymer has an electrical conductivity greater than about $10^{-4}$ S/cm.

6. The electrochemical energy storage device of claim 1, wherein the zwitterionic polymer unit comprises a repeating heterocyclic aromatic structure including at least one heteroatom, wherein each heteroatom is selected from the group consisting of oxygen (O), carbonyl, sulfur (S), nitrogen (N), and functionalized S or N.

7. The electrochemical energy storage device of claim 6, wherein the heterocyclic aromatic structure has two heteroatoms para to each other.

8. The electrochemical energy storage device of claim 6, wherein the heterocyclic aromatic structure further comprises a charge compensating substituent, such that the heteroatoms and the compensating substituent forms the first and second charge centers having opposite charge states that compensate each other.

9. The electrochemical energy storage device of claim 8, wherein the charge compensating substituent is selected to form a six-membered ring.

10. The electrochemical energy storage device of claim 8, wherein the charge compensating substituent is configured to form an anionic species, and wherein the charge compensating substituent has an oxidation potential from anionic to neutral state that is more positive than the redox potential corresponding to a transition of the heteroatom from neutral to cationic state.

11. The electrochemical energy storage device of claim 9, wherein the charge compensating substituent is configured to form a cationic species, and wherein the compensating substituent has a reduction potential from cationic to neutral state that is more negative than the redox potential corresponding to a transition of the heteroatom from neutral state to anionic state.

12. The electrochemical energy storage device of claim 1, wherein the at least one redox-active polymer comprises a structural group selected from the group consisting of quinones, phenothiazines, N-functionalized phenothiazines, thianthrenes, phenozines, phenoxazine, phenoxathiin, dihydrophenazine, dialkyldihydrophenazine, dibenzodioxin, benzofurans, benzodifurans, imides, phthalimides, N-substituted pthalimides, and their derivatives and combinations thereof.

13. The electrochemical energy storage device of claim 1, wherein the zwitterionic polymer unit comprises a structural group selected from the group consisting of

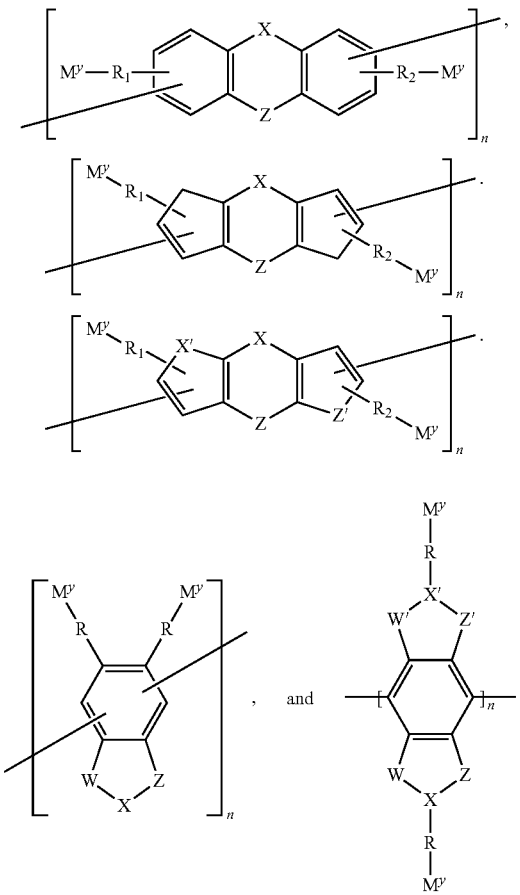

wherein W, W', X, X', Z and Z' are heteroatoms independently selected from the group consisting of oxygen, carbonyl, nitrogen, functionalized nitrogen and sulfur, wherein $M^y$ is an anion or cation selected from the group consisting of sulfate, phosphate, phosphonate, carboxylate, ammonium, halogenide, sulfonate, hydroxamate, trifluoroborate, acetate, imide, perchlorate, borate, nitro, halogen, cyano, sulfonyl, cyanate, isocyano, sulfonium, phosphonium, carbanion and carborane, wherein each of R, $R_1$ and $R_2$ is independently a hydrogen atom or one of a C1-C6 alkyl chain or a C1-C6 ether chain that is linear or branched and that is saturated or unsaturated, and wherein n is an integer representing repetition of subunits of the respective structural group.

14. The electrochemical energy storage device of claim 1; wherein the zwitterionic polymer unit comprises a structural group selected from the group consisting of:

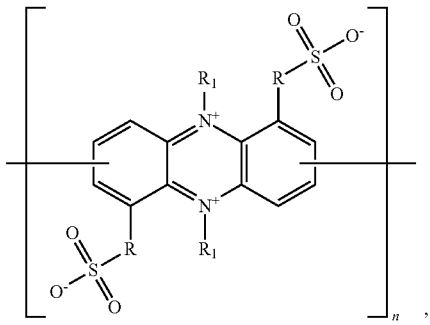

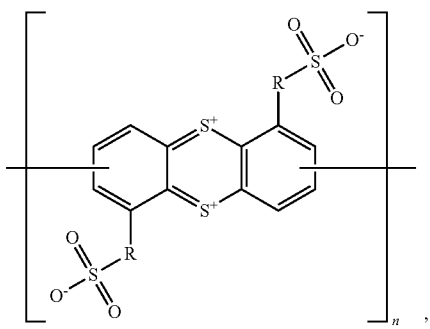

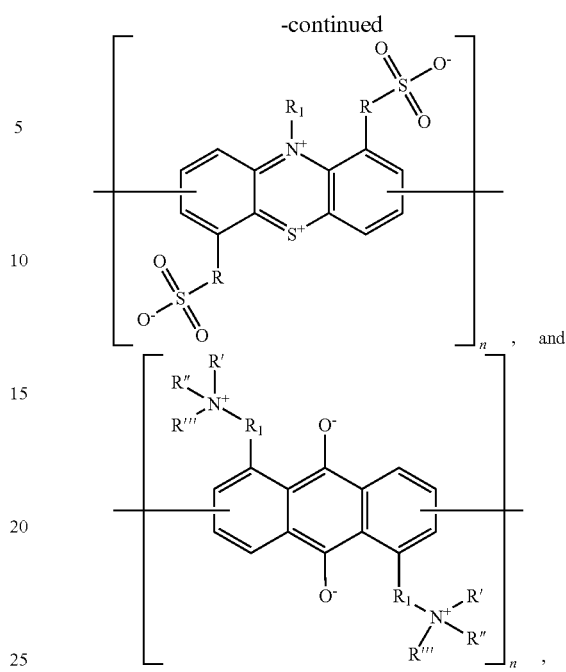

wherein each of R, $R_1$, R', R" and R'" is independently a hydrogen atom or one of a C1-C6 alkyl chain or a C1-C6 ether chain that is linear or branched and that is saturated or unsaturated, and wherein n is an integer representing repetition of subunits of the respective structural group.

15. The electrochemical energy storage device of claim 1, wherein the zwitterionic polymer unit comprises a structural group selected from the group consisting of:

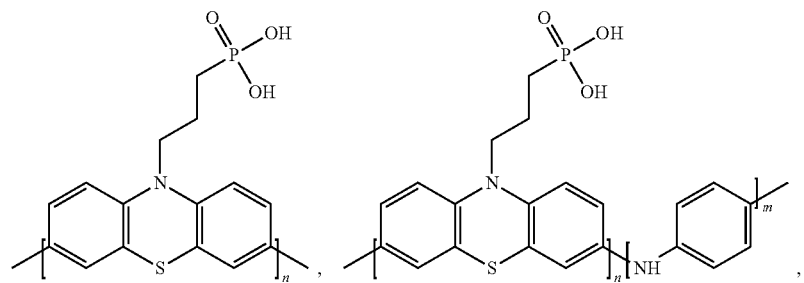

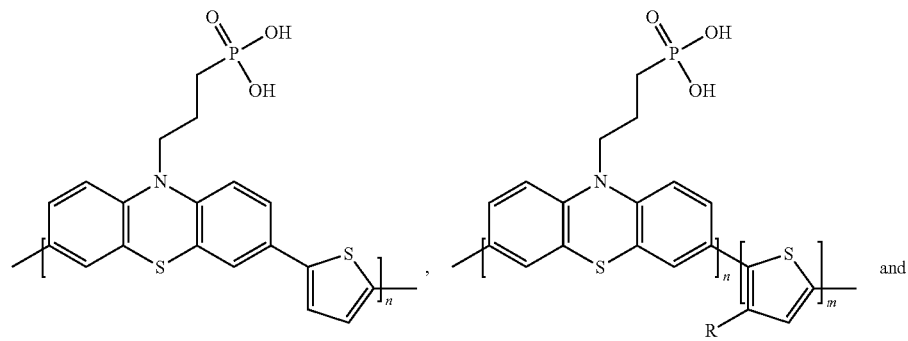

-continued

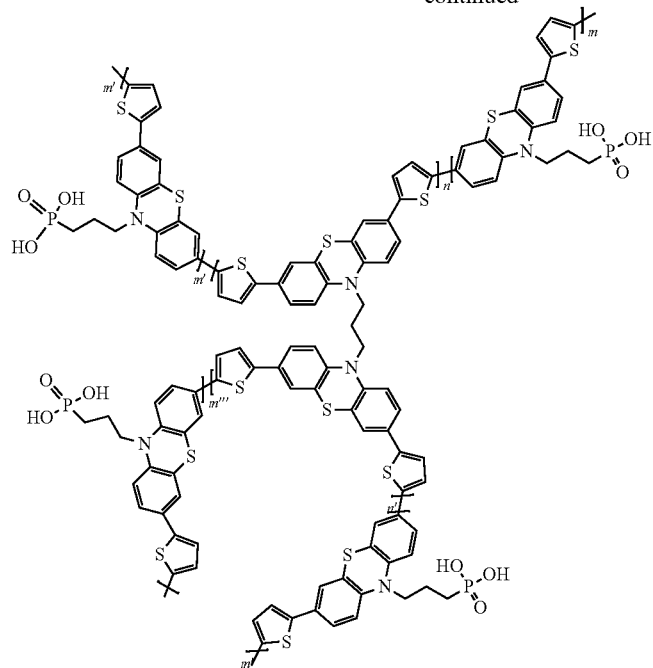

wherein R is a hydrogen atom or one of a C1-C6 alkyl chain or a C1-C6 ether chain that is linear or branched and that is saturated or unsaturated; and each of m, m', m", m''', n and n' is an integer representing repetition of respective subunits of the structural group.

16. The electrochemical energy storage device of claim 1, wherein the at least one of the negative electrode and the positive electrode further comprises a low dielectric constant additive configured to screen a zwitterionic charge.

17. The electrochemical energy storage device of claim 1, wherein the at least one of the negative electrode and the positive electrode further comprises a charge compensating polymer configured to screen a zwitterionic charge.

18. The electrochemical energy storage device of claim 1, wherein:
the negative electrode redox-active polymer is an n-type redox-active polymer configured to undergo a reversible redox reaction between a neutral state and a negatively charged state; and
the positive electrode redox-active polymer is a p-type redox-active polymer,
wherein the p-type redox-active polymer comprises a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state.

19. The electrochemical energy storage device of claim 1, wherein:
the negative electrode redox-active polymer is an n-type redox-active polymer,
wherein the n-type redox-active polymer comprises a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile anionic species in the cationic state; and
the positive electrode redox-active polymer is p-type redox-active polymer configured to undergo a reversible redox reaction between a neutral state and a positively charged state.

20. The electrochemical energy storage device of claim 1, wherein:
the negative electrode redox-active polymer is a p-type redox-active polymer,
wherein the negative redox-active polymer comprises a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state; and
the positive electrode redox-active polymer is a p-type redox-active polymer,
wherein the positive redox-active polymer comprises a zwitterionic polymer unit configured to reversibly switch between a zwitterionic state in which the zwitterionic polymer unit has third and fourth charge centers having opposite charge states that compensate each other, and a non-zwitterionic state in which the zwitterionic polymer unit has one of the third and fourth charge centers whose charge state is compensated by the mobile cationic species in the anionic state.

* * * * *